United States Patent
Wang et al.

(10) Patent No.: US 11,533,514 B2
(45) Date of Patent: Dec. 20, 2022

(54) ENCODING METHOD, DECODING METHOD, INFORMATION PROCESSING METHOD, ENCODING DEVICE, DECODING DEVICE, AND INFORMATION PROCESSING SYSTEM

(71) Applicant: Panasonic Intellectual Property Corporation of America, Torrance, CA (US)

(72) Inventors: Chi Wang, Singapore (SG); Pongsak Lasang, Singapore (SG); Toshiyasu Sugio, Osaka (JP); Tatsuya Koyama, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 96 days.

(21) Appl. No.: 16/911,775

(22) Filed: Jun. 25, 2020

(65) Prior Publication Data
US 2020/0329258 A1 Oct. 15, 2020

Related U.S. Application Data

(63) Continuation of application No. PCT/JP2018/048142, filed on Dec. 27, 2018.

(60) Provisional application No. 62/611,295, filed on Dec. 28, 2017.

(51) Int. Cl.
*H04N 19/90* (2014.01)
*G06N 3/02* (2006.01)

(52) U.S. Cl.
CPC ............... *H04N 19/90* (2014.11); *G06N 3/02* (2013.01)

(58) Field of Classification Search
CPC ...... G06N 3/02; G06N 3/0454; G06N 3/0472; G06N 3/084; G06N 3/088; H04N 19/46; H04N 19/90
See application file for complete search history.

(56) References Cited

U.S. PATENT DOCUMENTS

| 2010/0118971 | A1* | 5/2010 | Tanida | H04N 19/61 |
| | | | | 375/240.23 |
| 2013/0195352 | A1* | 8/2013 | Nystad | H04N 19/197 |
| | | | | 382/166 |
| 2013/0343664 | A1 | 12/2013 | Kobayashi | |

(Continued)

FOREIGN PATENT DOCUMENTS

| JP | 2013-34037 | 2/2013 |
| WO | 2017/104115 | 6/2017 |

OTHER PUBLICATIONS

Elbaz, G. et al., "3D Point Cloud Registration for Localization using a Deep Neural Network Auto-Encoder". Proceedings of 2017 IEEE Conference on Computer Vision and Pattern Recognition (CVPR), Jul. 26, 2017, pp. 2472-2481.*

(Continued)

*Primary Examiner* — Mohammed S Rahaman
(74) *Attorney, Agent, or Firm* — Wenderoth, Lind & Ponack, LLP

(57) ABSTRACT

An encoding method according to the present disclosure includes: inputting three-dimensional data including three-dimensional coordinate data to a deep neural network (DNN); encoding the three-dimensional data by the DNN to generate encoded three-dimensional data; and outputting the encoded three-dimensional data.

10 Claims, 20 Drawing Sheets

(56) References Cited

U.S. PATENT DOCUMENTS

| | | | |
|---|---|---|---|
| 2016/0379041 A1* | 12/2016 | Rhee | G06K 9/00288 |
| | | | 382/118 |
| 2018/0137224 A1* | 5/2018 | Hemmer | G06T 9/00 |
| 2018/0278956 A1 | 9/2018 | Toma et al. | |
| 2019/0289321 A1* | 9/2019 | Liu | H04N 19/89 |

OTHER PUBLICATIONS

Zhong, Zheng et al., "A Study on Improving Image Quality for Coding Method Using Neural Network". ITEJ Technical Report, Oct. 24, 1990, vol. 14, No. 55, pp. 13-18.*

Xun, Huang et al., "Stacked Generative Adversarial Networks". Proceedings of 2017 IEEE Conference on Computer Vision and Pattern Recognition (CVPR), Jul. 26, 2017, pp. 1866-1875.*

International Search Report (ISR) dated Mar. 5, 2019 in International (PCT) Application No. PCT/JP2018/048142.

Yan Huang, et al., "Octree-Based Progressive Geometry Coding of Point Clouds", Eurographics Symposium on Point-Based Graphics, 2006.

Quoc V. Le, "A Tutorial on Deep Learning Part 2: Autoencoders, Convolutional Neural Networks and Recurrent Neural Networks", [online], Oct. 2015, pp. 1-20 [retrieved on Feb. 18, 2019], Retrieved from the Internet:[URL: https://cs.stanford.edu/~quocle/].

Quoc V. Le, "A Tutorial on Deep Learning Part 1: Nonlinear Classifiers and the Backpropagation Algorithm", [online], Dec. 2015, pp. 1-18 [retrieved on Feb. 18, 2019], Retrieved from the Internet:[URL: https://cs.stanford.edu/~quocle/].

Xun Huang, et al., "Stacked Generative Adversarial Networks", Proceedings of 2017 IEEE Conference on Computer Vision and Pattern Recognition (CVPR), Jul. 2017, pp. 1866-1875.

Zhong Zheng, et al., "A Study on Improving Image Quality for Coding Method Using Neural Network", ITEJ Technical Report, vol. 14, No. 55, Oct. 1990, pp. 13-18 with partial English translation.

Gil Elbaz, et al., "3D Point Cloud Registration for Localization Using a Deep Neural Network Auto-Encoder", Proceedings of 2017 IEEE Conference on Computer Vision and Pattern Recognition (CVPR), Jul. 2017, pp. 2472-2481.

* cited by examiner

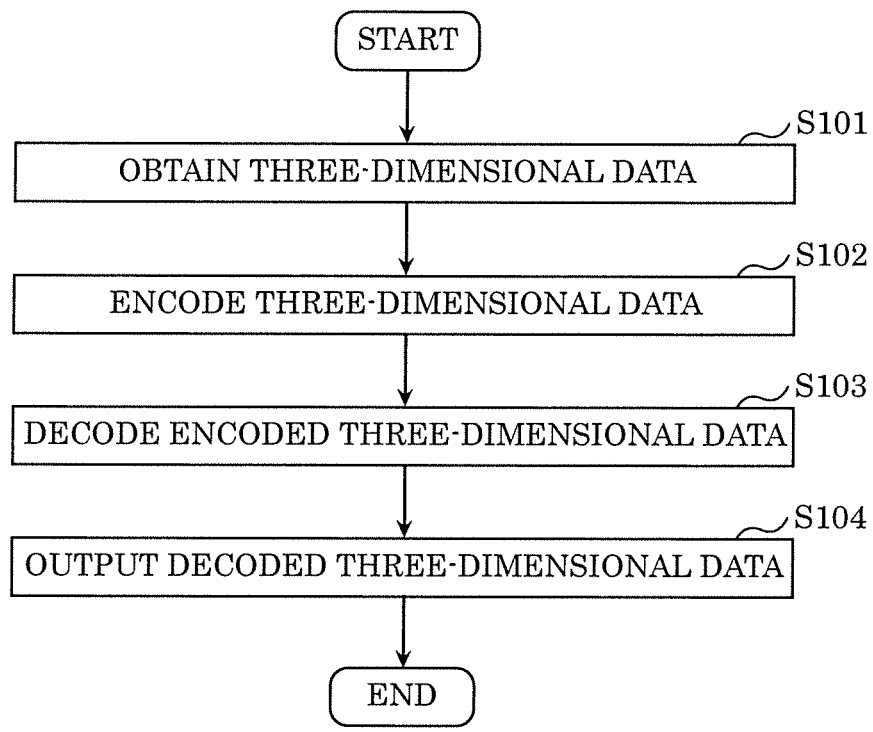
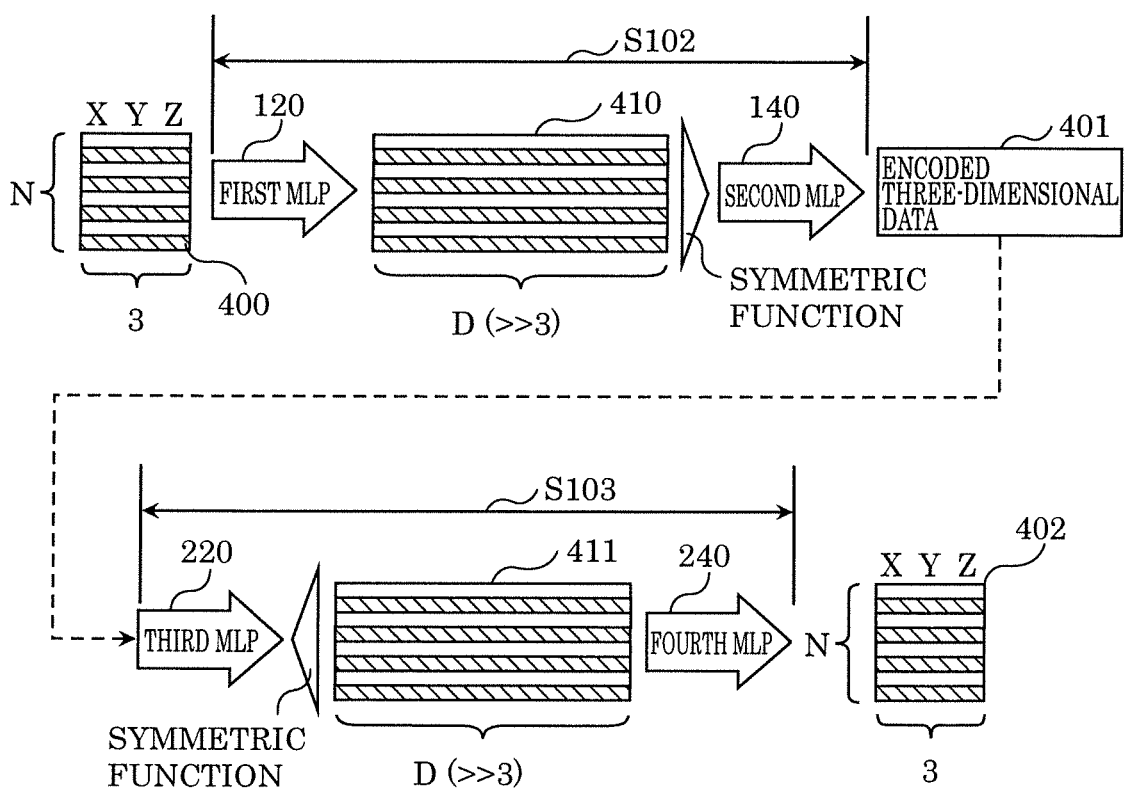

FIG. 4
(a) 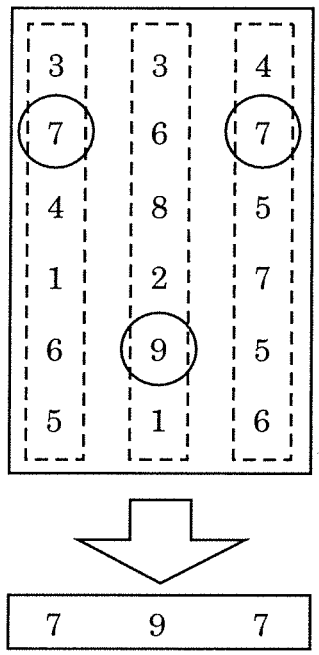
(b) 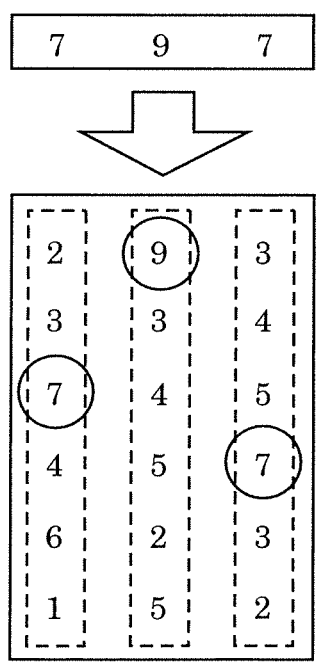

ENCODING METHOD, DECODING METHOD, INFORMATION PROCESSING METHOD, ENCODING DEVICE, DECODING DEVICE, AND INFORMATION PROCESSING SYSTEM

CROSS REFERENCE TO RELATED APPLICATIONS

This application is a U.S. continuation application of PCT International Patent Application Number PCT/JP2018/048142 filed on Dec. 27, 2018, claiming the benefit of priority of U.S. Patent Application No. 62/611,295 filed on Dec. 28, 2017, the entire contents of which are hereby incorporated by reference.

BACKGROUND

1. Technical Field

The present disclosure relates to an encoding method for encoding three-dimensional data, a decoding method for decoding encoded three-dimensional data, an information processing method for encoding three-dimensional data and decoding the encoded three-dimensional data, an encoding device which executes the encoding method, a decoding device which executes the decoding method, and an information processing system which executes the information processing method.

2. Description of the Related Art

In the future, it is expected that devices and/or services utilizing three-dimensional data will become popular in a wide variety of fields such as computer vision, map information, monitoring, infrastructure inspection, video distribution, etc. which allow vehicles or robots to operate autonomously. Three-dimensional data is obtained in various methods using, for example, distance sensors such as range finders, stereo cameras, or combinations of a plurality of single-lens cameras.

There is one method for representing three-dimensional data called a point cloud method which represents the shape of a three-dimensional structure using a point cloud in a three-dimensional space (for example, see Non-patent Literature 1 (Octree-Based Progressive Geometry Coding of Point Cloud, Eurographics Symposium on Point-Based Graphics (2006)).

In the point cloud method, for example, the positions of the point clouds (that is, combinations of coordinates) and colours are stored. It is expected that the point cloud method will become a mainstream as a three-dimensional data representation method. However, point clouds require an extremely large data amount. Thus, in storage and transmission of three-dimensional data, it is essential that the data amounts are compressed by encoding as in the case of two-dimensional videos (conforming to the MPEG-4 AVC standardized by the MPEG, HEVC, or the like).

In addition, compression of point clouds is partly supported by, for example, a public library (Point Cloud Library) which performs point cloud related processing.

SUMMARY

Since three-dimensional data generally require extremely large data amounts, storage devices having a very large capacity are required to store such three-dimensional data. Alternatively, transmission of three-dimensional data places extremely large communication loads on communication media.

For this reason, when three-dimensional data are actually used as applications, it is desired that the three-dimensional data be encoded after being compressed to a size as smaller as possible.

In view of this, the present disclosure provides an encoding method, etc. for encoding three-dimensional data effectively.

An encoding method according to an aspect of the present disclosure includes: inputting three-dimensional data including three-dimensional coordinate data to a deep neural network (DNN); encoding, by the DNN, the three-dimensional data to generate encoded three-dimensional data; and outputting the encoded three-dimensional data.

A decoding method according to an aspect of the present disclosure includes: inputting encoded three-dimensional data to a deep neural network (DNN), the encoded three-dimensional data being obtained by encoding first three-dimensional data including three-dimensional coordinate data; decoding, by the DNN, the encoded three dimensional data to generate second three-dimensional data; and outputting the second three-dimensional data.

In addition, an information processing method according to an aspect of the present disclosure includes: inputting first three-dimensional data including three-dimensional coordinate data to a first deep neural network (first DNN); encoding, by the first DNN, the first three-dimensional data to generate encoded three-dimensional data; inputting the encoded three-dimensional data to a second deep neural network (second DNN); decoding, by the second DNN, the encoded three dimensional data to generate second three-dimensional data; and outputting the second three-dimensional data.

In addition, an encoding device according to an aspect of the present disclosure includes a processor and a memory. Using the memory, the processor: inputs three-dimensional data including three-dimensional coordinate data to a deep neural network (DNN); encodes, by the DNN, the three-dimensional data to generate encoded three-dimensional data; and outputs the encoded three-dimensional data.

In addition, a decoding device according to an aspect of the present disclosure includes a processor and a memory. Using the memory, the processor: inputs encoded three-dimensional data to a deep neural network (DNN), the encoded three-dimensional data being obtained by encoding first three-dimensional data including three-dimensional coordinate data; decodes, by the DNN, the encoded three dimensional data to generate second three-dimensional data; and outputs the second three-dimensional data.

In addition, an information processing system according to an aspect of the present disclosure includes a processor and a memory. Using the memory, the processor: inputs first three-dimensional data including three-dimensional coordinate data to a first deep neural network (first DNN); encodes, by the first DNN, the first three-dimensional data to generate encoded three-dimensional data; inputs the encoded three-dimensional data to a second deep neural network (second DNN); decodes, by the second DNN, the encoded three dimensional data to generate second three-dimensional data; and outputs the second three-dimensional data.

It is to be noted that these general and specific aspects may be implemented using a system, a method, an integrated circuit, a computer program, or a computer-readable recording medium such as a CD-ROM, or any combination of systems, methods, integrated circuits, computer programs, or computer-readable recording media.

The encoding method, etc. according to aspects of the present disclosure make it possible to compress and encode three-dimensional data effectively.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 is a flow chart for illustrating encoding and decoding of three-dimensional data executed by the information processing system according to Embodiment 1.

FIG. 3 is a diagram for illustrating encoding and decoding of three-dimensional data executed by the information processing system according to Embodiment 1.

FIG. 4 is a diagram indicating a specific example of transform of three-dimensional data by a symmetric function which is used by the information processing system according to Embodiment 1.

DETAILED DESCRIPTION OF THE EMBODIMENTS

Outline of the Present Disclosure

Figure 1:
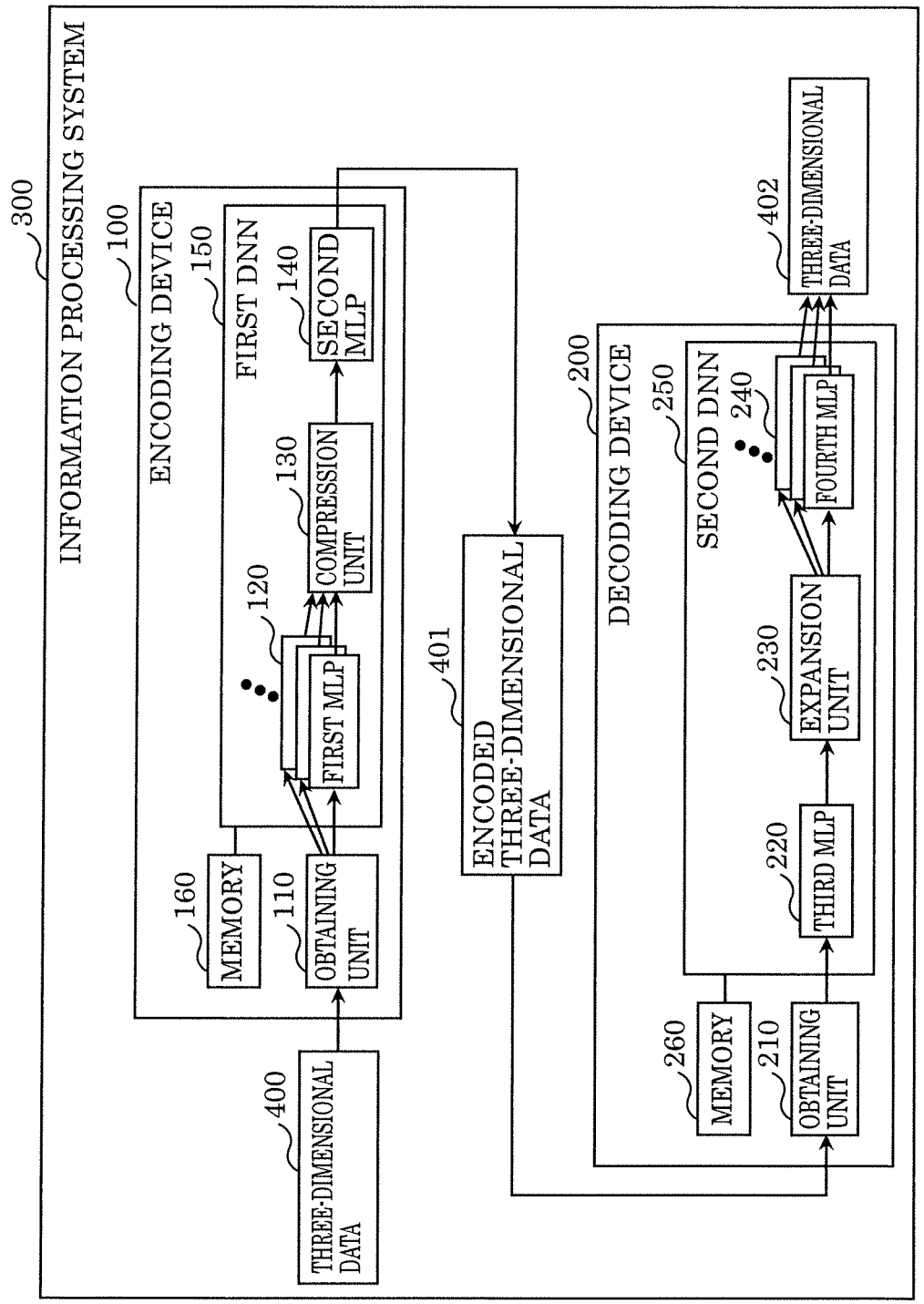
FIG. 1 is a block diagram for illustrating a functional configuration of an information processing system according to Embodiment 1.

Since three-dimensional data such as point clouds, etc. generally require extremely large data amounts, storage devices having a very large capacity are required to store the three-dimensional data. Alternatively, transmission of three-dimensional data places extremely large communication loads on communication media.

For this reason, when three-dimensional data are actually used as applications, it is desired that the three-dimensional data be effectively compressed to a size as smaller as possible in such a manner that the compressed data can be decompressed in short time.

The present disclosure provides (i) an encoding method which makes it possible to effectively compress and encode three-dimensional data, (ii) a decoding method which makes it possible to decode encoded three-dimensional data while reducing data losses from the original three-dimensional data, that is, to perform decoding effectively, (iii) an information processing method including such an encoding method and a decoding method, and (iv) devices (or a system) which execute(s) such an encoding method, a decoding method, and an information processing method.

An encoding method according to an aspect of the present disclosure includes: inputting three-dimensional data including three-dimensional coordinate data to a deep neural network (DNN); encoding, by the DNN, the three-dimensional data to generate encoded three-dimensional data; and outputting the encoded three-dimensional data.

According to this, the three-dimensional data are encoded using the DNN. The DNN makes it possible to efficiently transform high-dimensional data (which is, for example, data of at least three dimensions) as in the case of encoding of two-dimensional data, etc. For this reason, the use of DNN makes it possible to encode three-dimensional data with a compression rate higher than in a conventional geometric method. In addition, the three-dimensional data is encoded efficiently. In this way, when transmitting three-dimensional data from a device such as a server device to a device which is used by a user, it is possible to reduce the communication load to be required. Alternatively, it is possible to reduce the required capacity of a storage device which stores the three-dimensional data.

A decoding method according to an aspect of the present disclosure includes: inputting encoded three-dimensional data to a deep neural network (DNN), the encoded three-dimensional data being obtained by encoding first three-dimensional data including three-dimensional coordinate data; decoding, by the DNN, the encoded three dimensional data to generate second three-dimensional data; and outputting the second three-dimensional data.

According to this, the three-dimensional data are to be decoded using the DNN. The DNN makes it possible to decode the compressed low-dimensional data to generate original high-dimensional data with high reproducibility. For this reason, the use of the DNN makes it possible to decode three-dimensional data to generate three-dimensional data which is closer to the three-dimensional data before being encoded than one obtainable using a conventional geometric method.

An information processing method according to an aspect of the present disclosure includes: inputting first three-dimensional data including three-dimensional coordinate data to a first deep neural network (first DNN); encoding, by the first DNN, the first three-dimensional data to generate encoded three-dimensional data; inputting the encoded three-dimensional data to a second deep neural network (second DNN); decoding, by the second DNN, the encoded three dimensional data to generate second three-dimensional data; and outputting the second three-dimensional data.

According to this, the three-dimensional data are encoded and decoded using the DNN. The DNN makes it possible to efficiently transform high-dimensional data (which is, for example, data of at least three dimensions) as in the case of compression of two-dimensional data, etc. For this reason, the use of DNN makes it possible to encode three-dimensional data with a compression rate higher than in a conventional geometric method. In addition, the three-dimensional data is compressed efficiently. In this way, when transmitting three-dimensional data from a server device to a device which is used by a user, it is possible to reduce the communication load to be required. Alternatively, it is possible to reduce the required capacity of a storage device which stores the three-dimensional data. According to this, the three-dimensional data are decoded using the DNN. The DNN makes it possible to decode the compressed low-dimensional data to generate original high-dimensional data with high reproducibility. For this reason, the use of the DNN makes it possible to decode three-dimensional data to generate three-dimensional data which is closer to the three-dimensional data before being encoded than one obtainable using a conventional geometric method. In this way, the information processing method according to the aspect of the present disclosure makes it possible to encode three-dimensional data effectively. The information processing method also makes it possible to decode encoded three-dimensional data effectively.

In addition, for example, an information processing method according to an aspect of the present disclosure further includes: calculating a computing loss which is a difference between the first three-dimensional data and the second three-dimensional data; and updating a first parameter and a second parameter based on the computing loss. The first parameter is for encoding of the first three-dimensional data by the first DNN, and the second parameter is for decoding of the encoded three-dimensional data by the second DNN.

According to this, it is possible to update the parameters to be used for encoding and decoding by the first DNN and the second DNN so that the first DNN and the second DNN can encode and decode the three-dimensional data effectively.

In addition, for example, an information processing method according to an aspect of the present disclosure further includes: calculating an adversarial loss indicating similarity between the first three-dimensional data and the second three-dimensional data. In the updating, the first parameter and the second parameter are updated based on the computing loss and the adversarial loss.

According to this, it is possible to update the parameters to be used for encoding and decoding by the first DNN and the second DNN so that the first DNN and the second DNN can encode and decode the three-dimensional data more effectively.

In addition, for example, in an information processing method according to an aspect of the present disclosure: in the inputting of first three-dimensional data, the first three-dimensional data including one or more three-dimensional data and a first code length are input; and in the encoding, the one or more first three-dimensional data are encoded based on the first code length to generate a bitstream including a total number of the one or more first three-dimensional data encoded and the first code length.

According to this, it is possible to select the code length appropriately, and causes first DNN 150 to generate encoded three-dimensional data 401 having a desired coding amount.

In addition, for example, in an information processing method according to an aspect of the present disclosure: in the inputting of first three-dimensional data, a plurality of the first three-dimensional data and the first code length are input; and in the encoding, the plurality of the first three-dimensional data are sequentially encoded based on the first code length to generate the encoded three-dimensional data, and when a data amount of the encoded three-dimensional data generated exceeds a predetermined target data amount, a code length to be used to encode a next one of the plurality of the first three-dimensional data is changed to a second code length which is shorter than the first code length.

According to this, when the plurality of the three-dimensional data are input sequentially to the first DNN, the code length suitable for encoding the next three-dimensional data can be selected each time the first DNN encodes a current one of the three-dimensional data. For this reason, according to the method, the first DNN can generate encoded three-dimensional data having a desirable encoding amount more easily.

In addition, for example, in an information processing method according to an aspect of the present disclosure: the first three-dimensional data further includes attribute information; in the inputting of first three-dimensional data, the first DNN is selected from a plurality of the first DNNs based on the attribute information and is input; the bitstream further includes a DNN identifier indicating the first DNN input in the inputting of first three-dimensional data; and in the inputting of the encoded three-dimensional data, the second DNN is selected from a plurality of the second DNNs based on the DNN identifier and is input.

For example, optimum parameters to be used for encoding by the first DNN may vary depending on information included in three-dimensional data of persons, traffic lights, etc. In such a case, according to the information processing method according to the aspect of the present disclosure, it is possible to cause the first DNN which performs encoding using a suitable parameter to encode three-dimensional data based on information included in the three-dimensional data. For this reason, according to the method, the three-dimensional data is likely to be encoded more effectively. Likewise, according to the method, it is possible to cause the second DNN which performs decoding using a suitable parameter to decode three-dimensional data based on information included in the three-dimensional data. For this reason, according to the method, the three-dimensional data is likely to be decoded more effectively.

It is to be noted that these general and specific aspects may be implemented using a system, a method, an integrated circuit, a computer program, or a computer-readable recording medium such as a CD-ROM, or any combination of systems, methods, integrated circuits, computer programs, or computer-readable recording media.

For example, an encoding device according to an aspect of the present disclosure includes a processor and a memory. Using the memory, the processor: inputs three-dimensional data including three-dimensional coordinate data to a deep neural network (DNN); encodes, by the DNN, the three-dimensional data to generate encoded three-dimensional data; and outputs the encoded three-dimensional data.

The encoding device which executes the encoding method according to the aspect of the present disclosure can be implemented as a device capable of providing the same effects as those obtainable using the encoding method according to the aspect of the present disclosure.

In addition, for example, a decoding device according to an aspect of the present disclosure includes a processor and a memory. Using the memory, the processor: inputs encoded three-dimensional data to a deep neural network (DNN), the encoded three-dimensional data being obtained by encoding first three-dimensional data including three-dimensional coordinate data; decodes, by the DNN, the encoded three dimensional data to generate second three-dimensional data; and outputs the second three-dimensional data.

The decoding device which executes the decoding method according to the aspect of the present disclosure can be implemented as a device capable of providing the same effects as those obtainable using the decoding method according to the aspect of the present disclosure.

In addition, an information processing system according to an aspect of the present disclosure includes a processor and a memory. Using the memory, the processor: inputs first three-dimensional data including three-dimensional coordinate data to a first deep neural network (first DNN); encodes, by the first DNN, the first three-dimensional data to generate encoded three-dimensional data; inputs the encoded three-dimensional data to a second deep neural network (second DNN); decodes, by the second DNN, the encoded three dimensional data to generate second three-dimensional data; and outputs the second three-dimensional data.

The information processing system which executes the information processing system according to the aspect of the present disclosure can be implemented as an information processing system capable of providing the same effects as those obtainable using the information processing method according to the aspect of the present disclosure.

Hereinafter, embodiments of the present disclosure are described in detail with reference to the drawings.

It is to be noted that each of the embodiments described below indicates a generic or specific example of the present disclosure. The numerical values, shapes, materials, constituent elements, the arrangement and connection of the constituent elements, steps, the processing order of the steps etc. indicated in the following embodiments are mere examples, and therefore do not intend to limit the present disclosure. In addition, among the constituent elements in the following embodiments, constituent elements not recited in any one of the independent claims that define the most generic concept are described as optional constituent elements.

Embodiment 1

Outline

<Configuration>

First, outlines of configurations of an encoding device, a decoding device, an information processing system according to Embodiment 1 are described with reference to FIG. 1.

FIG. 1 is a block diagram for illustrating a configuration of information processing system 300 including encoding device 100 and decoding device 200 according to Embodiment 1.

Information processing system 300 is a system which encodes three-dimensional data (first three-dimensional data) 400 including three-dimensional coordinate data using a Deep Neural Network (DNN), and decode encoded three-dimensional data 401 which is encoded three-dimensional data 400 using the DNN to generate three-dimensional data (second three-dimensional data) 402.

Three-dimensional data 400 are, for example, point cloud data (what is called three-dimensional point clouds) including three-dimensional coordinate data, supplemental information such as colour information at each combination of coordinates and normal vectors, etc.

Information processing system 300 includes encoding device 100 and decoding device 200.

Encoding device 100 is a device which encodes input three-dimensional data 400 which has been input, using the DNN. Decoding device 200 is a device which decodes three-dimensional data 400 (encoded three-dimensional data 401) encoded by encoding device 100, using the DNN. For example, encoding device 100 and decoding device 200 are communicatively connected to each other, and arranged apart from each other. Information processing system 300 is, for example, a system in which: encoding device 100 compresses and encodes three-dimensional data 400 having a large data amount to generate encoded three-dimensional data 401, and transmits encoded three-dimensional data 401 generated to decoding device 200; and decoding device 200 decodes encoded three-dimensional data 401. In this way, information processing system 300 is capable of reducing data amount for communication, thereby allowing use of three-dimensional data 400 having the large data amount at a location of decoding device 200.

<Processing Order>

Next, outlines of processing orders taken by encoding device 100, decoding device 200, and information processing system 300 according to Embodiment 1 are described with reference to FIG. 2 to FIG. 4.

FIG. 2 is a flow chart for illustrating encoding and decoding of three-dimensional data 400 executed by information processing system 300 according to Embodiment 1. FIG. 3 is a diagram for illustrating encoding and decoding of three-dimensional data 400 executed by information processing system 300 according to Embodiment 1.

As illustrated in FIG. 2, first, encoding device 100 obtains three-dimensional data 400 (Step S101). More specifically, encoding device 100 causes first DNN 150 to be described later to input three-dimensional data 400 obtained by obtaining unit 110 to be described later (a first input step). FIG. 3 illustrates three-dimensional data 400 which includes N data including three-dimensional coordinate data of coordinate X, coordinate Y, and coordinate Z.

It is to be noted that, when encoding device 100 has obtained a plurality of three-dimensional data 400, encoding device 100 inputs each of the plurality of three-dimensional data 400 to first Multi-Layer Perceptron (MLP) included in a different one of first DNNs 150.

With reference to FIG. 2 again, next to Step S101, encoding device 100 executes an encoding step of encoding the three-dimensional data 400 (Step S102). More specifically, as illustrated in FIG. 3, encoding device 100 generates, by using first MLP 120, high-dimensional transformed data 410 transformed to be high-dimensional from three-dimensional data 400, based on feature points included in three-dimensional data 400, reduces the number of data using a symmetric function, and then generates encoded three-dimensional data 401 by using second MLP 140 and outputs the encoded three-dimensional data 401 generated. FIG. 3 illustrates transformed data 410 obtained by transforming three-dimensional data 400 to be D (>>3) dimensional.

With reference to FIG. 2 again, next to Step S102, encoding device 100 outputs encoded three-dimensional data 401 (a first output step), to allow encoded three-dimensional data 401 to be input to decoding device 200 (a second input step). Decoding device 200 executes a decoding step of decoding encoded three-dimensional data 401 (Step S103). More specifically, as illustrated in FIG. 3, decoding device 200 further generates, by using third MLP 220, high-dimensional transformed data 411 transformed, using a symmetric function, to be high-dimensional from encoded three-dimensional data 401, based on feature points included in encoded three-dimensional data 401, generates, by using fourth MLP 240, three-dimensional data 402 from transformed data 411, and outputs three-dimensional data 402 generated. Here, transformed data 411 is the same D (>>3) dimensional as transformed data 410 is. In addition, three-dimensional data 402 is three-dimensional as three-dimensional data 400 is. In addition, the symmetric function which is used in Step S103 is an inverse function of the symmetric function which is used in Step S102. In this way, decoding device 200 performs transform inverse to the encoding executed by encoding device 100, and decodes encoded three-dimensional data 401 to generate three-dimensional data 402.

FIG. 4 is a diagram indicating a specific example of transform of three-dimensional data 400 by the symmetric function which is used by information processing system 300 according to Embodiment 1. FIG. 4 illustrates, as one example, a case of transforming data of 6 rows×3 columns into data of 1 row×3 columns, and transforming the data of 1 row×3 columns into the original data of 6 rows×3 columns.

As illustrated in (a) of FIG. 4, encoding device 100 (more specifically, compression unit 130 to be described later) reduces the dimensions of data, for example, by using a max function as a symmetric function. The max function is a function for extracting a maximum value in each of columns of data. As illustrated in (a) of FIG. 4, encoding device 100 extracts "7", "9", and "7" which are the maximum values in the respective columns, and newly generates data of 1 row×3 columns. In addition, as illustrated in (b) of FIG. 4, decoding device 200 (more specifically, expansion unit 230 to be described later) returns the number of data that encoding device 100 has reduced using the symmetric function. For example, as illustrated in (b) of FIG. 4, decoding device 200 generates data of 6 rows×3 columns from "7", "9", and "7" obtained from encoding device 100. In this way, the communication amount of data to be transmitted from encoding device 100 to decoding device 200 can be reduced. For example, decoding device 200 arranges the maximum values obtained from encoding device 100 in the columns at random. In addition, for example, decoding device 200 generates data point values other than the maximum values in such a manner that the data point values correspond to the values of the original data of 6 rows×3 columns, and arranges the data point values at random. In addition, for example, decoding device 200 generates data of the same numbers of rows and columns as those of the original data in such a manner that each of the columns has a distribution of different numerical values. In FIG. 4, (b) indicates that data of 6 rows×3 columns are generated in such a manner that the distributions of the respective three columns are "237461", "934525", and "345732". In this way, decoding device 200 reconstructs the original number of data (original number of rows) from the number of data (the number of rows) reduced by encoder 100.

With reference to FIG. 2 again, next to Step S103, decoding device 200 executes a second output step of outputting three-dimensional data 402 obtained by decoding encoded three-dimensional data 401 (Step S104).

Hereinafter, details of encoding device 100 and decoding device 200 are described.

[Encoding Device]

Hereinafter, details of encoding device 100 are described with reference to FIGS. 1, 5, and 6.

<Configuration>

Encoding device 100 is a device which encodes three-dimensional data 400 which has been input, using a DNN (first DNN 150). As illustrated in FIG. 1, encoding device 100 includes obtaining unit 110, first DNN 150, and memory 160.

Obtaining unit 110 is a processing unit which obtains input three-dimensional data 400, and inputs three-dimensional data 400 to first DNN 150 (more specifically, first MLP 120). Obtaining unit 110 includes, for example, a communication interface for communicatively connecting to three-dimensional camera 500 (see FIG. 14) which captures three-dimensional images. For example, obtaining unit 110 obtains, as three-dimensional data 400, the three-dimensional images captured by three-dimensional camera 500. In addition, for example, when a plurality of data are included in three-dimensional data 400, obtaining unit 110 inputs each of the plurality of data to a different one of first MLPs 120.

First DNN 150 is an encoding module which encodes three-dimensional data 400 obtained by obtaining unit 110. For example, first DNN 150 is a processor for encoding three-dimensional data 400. First DNN 150 encodes three-dimensional data 400 using a Multi-Layer Perceptron (MLP), based on a control program which has been stored in memory 160 in advance.

It is to be noted that encoding device 100 may include a plurality of first MLPs 120 according to the number of three-dimensional data 400. For example, when encoding device 100 is a device which obtains N three-dimensional data 400 and encodes them, encoding device 100 includes N first MLPs 120. For example, when obtaining unit 110 obtains N three-dimensional data 400, each of M (<N) first MLPs 120 may process at least one different three-dimensional data 400. More specifically, in the case where obtaining unit 110 obtains twelve three-dimensional data 400 when encoding device 100 includes three first MLPs 120, obtaining unit 110 may input twelve three-dimensional data 400 by inputting four three-dimensional data 400 into each of three first MLPs 120, and each of three first MLPs 120 may process four three-dimensional data 400. In other words, in the case where obtaining unit 110 obtains a plurality of three-dimensional data 400 when encoding device 100 includes the plurality of first MLPs 120, encoding device 100 may cause the plurality of first MLPs 120 to share the processing of the plurality of three-dimensional data 400. In this way, with the plurality of first MLPs 120, encoding device 100 is capable of facilitating the processing which is executed by the plurality of first MLPs 120.

In addition, encoding device 100 may include single first MLP 120. In this case, when obtaining unit 110 obtains N three-dimensional data 400, for example, single first MLP 120 sequentially processes N three-dimensional data 400. In this way, when encoding device 100 includes single first MLP 120, it is possible to reduce a required capacity of a memory in which a control program is stored, and/or the size of processing circuitry such as a processor, compared to the case where encoding device 100 includes a plurality of first MLPs 120.

An MLP is a kind of an artificial neural network, and has at least three-layer nodes. Each of the nodes other than an input node in the MLP is an artificial neuron which uses a non-linear activation function (non-linear function or a transfer function which is used after linear transform in a neural network).

First DNN 150 includes, as functional elements, first MLP 120, compression unit 130, and second MLP 140.

First MLP 120 is a processing unit which transforms three-dimensional data 400 into higher-dimensional data once in order to encode three-dimensional data 400 effectively. First MLP 120 outputs the higher-dimensional data to compression unit 130.

Compression unit 130 is a processing unit which reduces, using a symmetric function, the number of data which have been transformed to be higher-dimensional data by first MLP 120. For example, compression unit 130 reduces the number of data which have been transformed to be higher-dimensional data by first MLP 120, by using a max function as the symmetric function.

Second MLP 140 transforms the data reduced in number by compression unit 130 into data having predetermined dimensions to generate encoded three-dimensional data 401, and outputs encoded three-dimensional data 401. For example, when obtaining unit 110 obtains a plurality of three-dimensional data 400, second MLP 140 generates bitstream 430 (see FIG. 5) including the plurality of encoded three-dimensional data 401, and outputs bitstream 430 generated.

It is to be noted that the number of second MLPs 140 does not need to match the number of first MLPs 120, and may be one, for example. In addition, first MLP 120 and second MLP 140 are MLPs which execute processing using different parameters.

In addition, encoding device 100 may transmit encoded three-dimensional data 401 to decoding device 200 by outputting encoded three-dimensional data 401 to decoding device 200, or may store encoded three-dimensional data 401 in memory 160, a not-shown storage, or the like by outputting encoded three-dimensional data 401 to a storage that is for example a not-shown HDD.

Memory 160 is a storage for storing a control program which is executed by first DNN 150. For example, memory 160 is implemented as a Hard Disk Drive (HDD), a Random Access Memory (RAM) such as a flash memory.

For example, memory 160 stores a parameter (first parameter) which is used for encoding executed by first MLP 120 and second MLP 140. In other words, first MLP 120 and second MLP 140 encode three-dimensional data 400, based on the parameter for encoding three-dimensional data 400.

Figure 5:
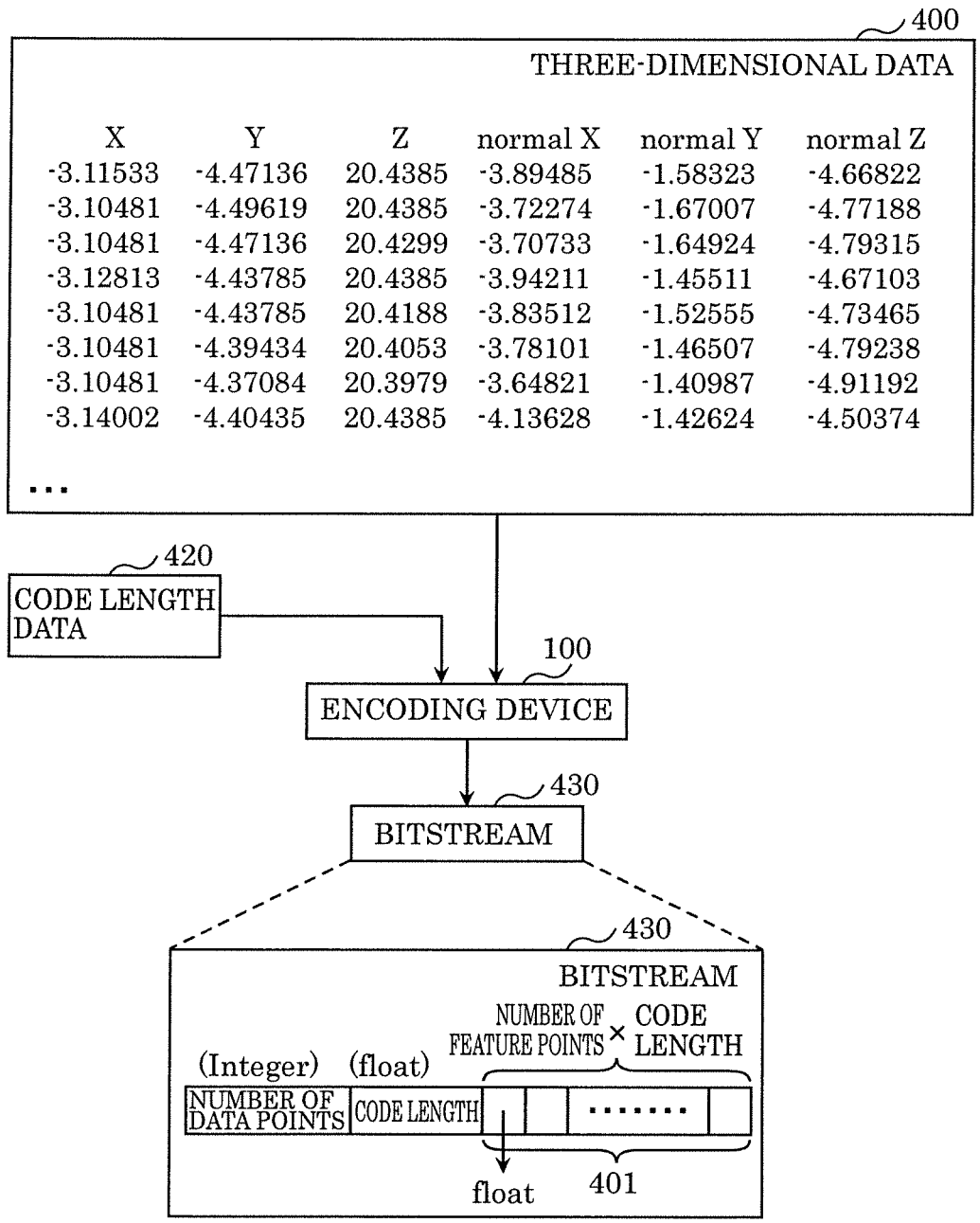
FIG. 5 is a diagram indicating a specific example of a bitstream including three-dimensional data and encoded three-dimensional data which is generated by an encoding device according to Embodiment 1.

FIG. 5 is a diagram illustrating a specific example of three-dimensional data 400 and bitstream 430 including encoded three-dimensional data 401 generated by encoding device 100 according to Embodiment 1.

For example, as illustrated in FIG. 5, encoding device 100 obtains, from a not-shown outside device, three-dimensional data 400 and data including a code length (code length data 420). Code length data 420 is data including the code length (numerical value) of encoded three-dimensional data 401 generated by encoding device 100. Encoding device 100 decides the code length of encoded three-dimensional data 401 based on code length data 420 obtained, and generates encoded three-dimensional data 401 having the determined code length.

It is to be noted that the code length may be stored in memory 160 in advance. In this case, encoding device 100 generates encoded three-dimensional data 401 based on the code length stored in memory 160.

In addition, for example, code length data 420 may include a plurality of code lengths. In this case, for example, different first DNN 150 may be used for each of three-dimensional data 400 which are encoded based on the code lengths.

In addition, three-dimensional data 400 may include data other than three-dimensional coordinate data. For example, three-dimensional data 400 may include colour information represented by RGB, YUV, or the like, reflectance information indicating reflectance obtained by LiDAR, or the like. In addition, FIG. 5 indicates the values of respective data included in three-dimensional data 400 as numerical values with decimal points. However, three-dimensional data 400 may include numerical values each transformed into an integer by scaling the value of each data included in three-dimensional data 400 or rounding off the value to the nearest integer before obtaining unit 110 obtains three-dimensional data 400. Here, scaling is processing for changing the position of a decimal point of the value of each data included in three-dimensional data 400 by multiplying the value of each data by 10, or the like. Encoding device 100 may encode three-dimensional data 400 having each data transformed into an integer as described above. FIG. 5 illustrates three-dimensional data 400 including normal vectors (normal X, normal Y, and normal Z) of planes defined by adjacent coordinate points, as data other than three-dimensional coordinate data.

In addition, when three-dimensional data 400 includes data indicated as a numerical value with a decimal point, encoder 100 may transform the data into an integer, and then encodes three-dimensional data 400. More specifically, for example, encoding device 100 may further include an integer transform unit which transforms data indicated by a numerical value with a decimal point into an integer. In such a case, encoding device 100 may include scaling information indicating details of the scaling executed, in a header of bitstream 430. In addition, in such a case, decoding device 200 may decode encoded three-dimensional data 401 based on the scaling information included in the header of bitstream 430.

In addition, encoding device 100 may encode three-dimensional data 400 by integer computation. In addition, decoding device 200 may decode encoded three-dimensional data 401 by integer computation. For example, FIG. 5 illustrates a case where the code length included in bitstream 430 is of float type (is a floating point number). However, the code length included in bitstream 430 may be of integer type (be an integer). In this way, it is possible to accelerate encoding and/or decoding by encoding device 100 and/or decoding device 200 encoding and/or decoding three-dimensional data 400 by integer computation. In addition, there is a possibility that the size of circuitry such as a processor, etc. included in each of encoding device 100 and/or decoding device 200 is reduced.

Encoding device 100 generates bitstream 430 including encoded three-dimensional data 401, for example, when transmitting encoded three-dimensional data 401 to decoding device 200.

Bitstream 430 includes packets including encoded three-dimensional data 401. Bitstream 430 includes, for example, the number of data points (data point number) of three-dimensional data 400, a code length, and encoded three-dimensional data 401. Encoded three-dimensional data includes, for example, an integrated number obtained by integrating the number of data points obtained at the time of encoding of three-dimensional data 400 (in other words, the data points are feature points, and the number thereof is the number of feature points), and the code length.

Encoding device 100 transmits encoded three-dimensional data 401 generated, or bitstream 430 generated, to decoding device 200. Alternatively, encoding device 100 stores encoded three-dimensional data 401 generated, or bitstream 430 generated, in memory 160 or a storage such as a not-shown HDD, or the like.

<Processing Order>

Figure 6:
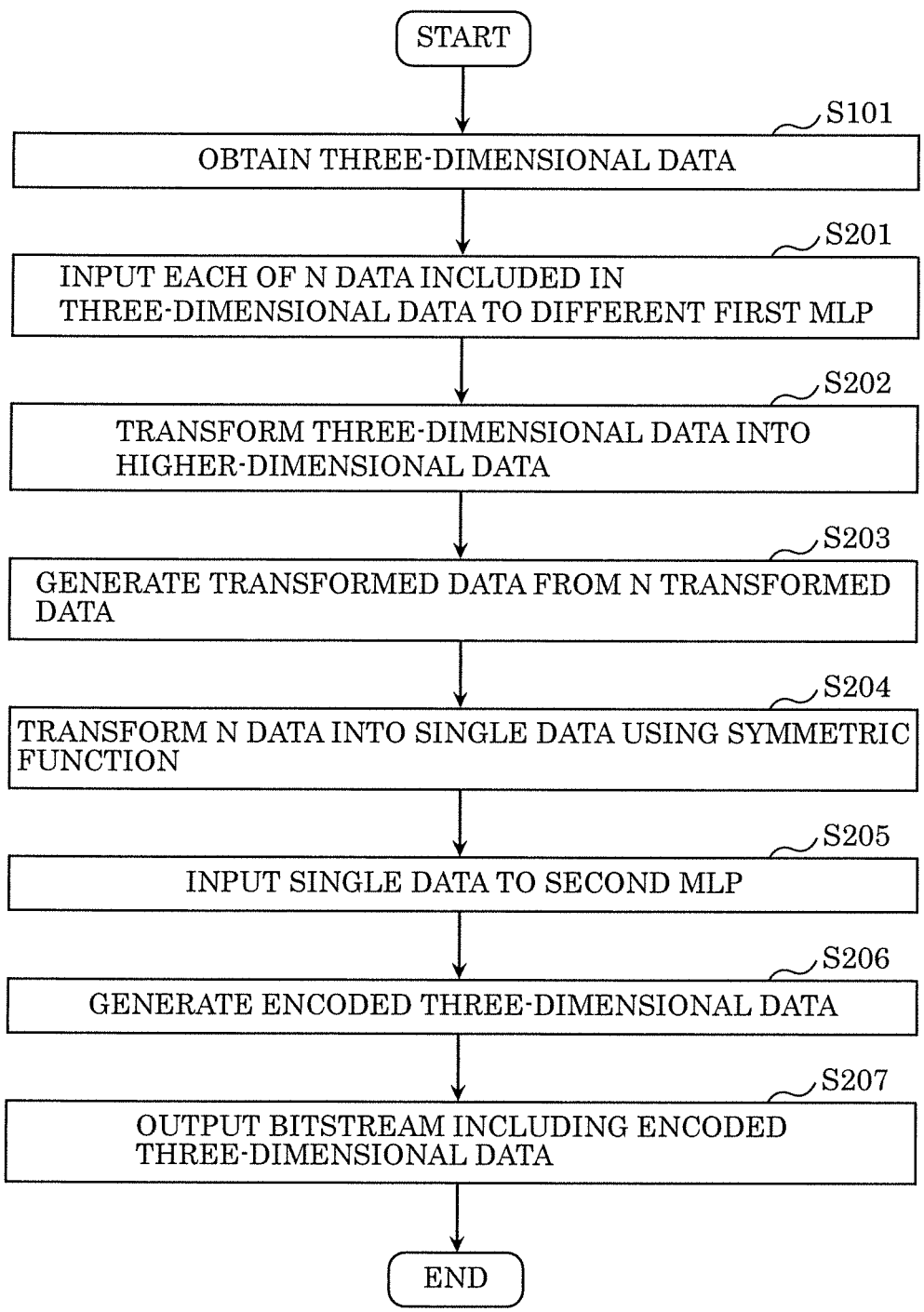
FIG. 6 is a flow chart indicating details of a processing procedure taken by the encoding device according to Embodiment 1.

FIG. 6 is a flow chart indicating details of a processing procedure taken by encoding device 100 according to Embodiment 1. Steps S201 to S207 illustrated in FIG. 6 is a specific example of Step S102 illustrated in FIG. 2. It is to be noted that the flow chart in FIG. 6 indicates a case where encoding device 100 encodes three-dimensional data 400 including N data, and encoding device 100 includes N first MLPs 120. In addition, N first MLPs 120 have the same parameter for encoding three-dimensional data 400.

First, obtaining unit 110 obtains three-dimensional data 400 including N data (Step S101). In addition, for example, obtaining unit 110 obtains code length data 420 including a code length in Step S101.

Next, obtaining unit 110 inputs each of the N data included in three-dimensional data 400 obtained by obtaining unit 110 to a different one of first MLPs 120 (Step S201). For example, in Step S201, obtaining unit 110 inputs one of the N data included in three-dimensional data 400 to single first MLP 120.

It is to be noted that, when obtaining unit 110 obtains N three-dimensional data 400, the order of three-dimensional data 400 to be input to first DNN 150, that is, the order of three-dimensional data 400 to be encoded by first DNN 150 is not particularly limited. Three-dimensional data 400 includes three-dimensional coordinate data. For this reason, even when the order of three-dimensional data 400 to be encoded by first DNN 150 is at random, decoding unit 200 is capable of decoding the encoded three-dimensional data to generate three-dimensional data 402 whose order is the same as the order of three-dimensional data 400.

Next, first MLP 120 transforms three-dimensional data 400 input to higher-dimensional transformed data (Step S202). In Step S202, for example, first MLP 120 transforms three-dimensional data 400 input to transformed data of D dimensions higher than three dimensions, and outputs the D-dimensional data transformed. When encoding device 100 includes a plurality of first MLPs 120, each of the plurality of first MLPs 120 executes Step S201 and Step S202.

Next, encoding device 100 generates transformed data 410 of N rows×D columns, from a plurality of high-dimensional data transformed into D-dimensional data by the plurality of first MLPs 120 (Step S203). More specifically, encoding device 100 generates transformed data 410 of N rows×D columns from N data transformed into D-dimensional data by N first MLPs 120.

It is to be noted that encoding device 100 may further include a not-shown processing unit which executes Step S203. In addition, Step S203 may be executed by compression unit 130.

Next, compression unit 130 generates data of 1 row×D columns by reducing the data number (the number of rows) of transformed data 410 generated in Step S203, using a symmetric function (more specifically, a max function) along every column thereof (that is, for each of the D columns) (Step S204).

Next, compression unit 130 inputs, to second MLP 140, the data of 1 row×D columns generated in Step S204 (Step S205).

Next, second MLP 140 generates encoded three-dimensional data 401 (Step S206). For example, in Step S205, second MLP 140 transforms the data of 1 row×D columns generated in Step S204 into data of 1 row×L D) columns generated in Step S204 based on the code length included in code length data 420, to generate encoded three-dimensional data 401.

Next, second MLP 140 generates bitstream 430 including encoded three-dimensional data 401, a code length, and the number of data points of three-dimensional data 400, and outputs bitstream 430 (Step S207).

Effects, Etc.

As described above, encoding device 100 includes a processor and memory 160. Using memory 160, the processor inputs three-dimensional data 400 including three-dimensional coordinate data to first DNN 150, encodes, by first DNN 150, three-dimensional data 400 to generate encoded three-dimensional data 401, and outputs encoded three-dimensional data 401. More specifically, encoding device 100 includes: obtaining unit 110 which obtains three-dimensional data 400; and first DNN 150 which encodes three-dimensional data 400 obtained by obtaining unit 110 to generate encoded three-dimensional data 401, and outputs encoded three-dimensional data 401 to first DNN 150.

In addition, the encoding method executed by encoding device 100 according to Embodiment 1 includes: a first input step of inputting three-dimensional data 400 including three-dimensional coordinate data to first DNN 150; an encoding step of encoding three-dimensional data 400 by first DNN 150 to generate encoded three-dimensional data 401; and a first outputting step of outputting encoded three-dimensional data 401.

With this configuration, three-dimensional data 400 is to be encoded using first DNN 150. First DNN 150 makes it possible to efficiently transform high-dimensional data (which is, for example, data of at least three dimensions) as in the case of encoding of two-dimensional data, etc. For this reason, the use of first DNN 150 makes it possible to encode three-dimensional data 400 with a compression rate higher than in a conventional geometric method. In addition, three-dimensional data 400 is encoded efficiently. In this way, when transmitting three-dimensional data 400 from a device which is used by a user to a device such as a server, it is possible to reduce the communication load to be required. Alternatively, it is possible to reduce the required capacity of a storage device which stores three-dimensional data 400.

In addition, for example, in the encoding method executed by encoding device 100 according to Embodiment 1; in the first input step, at least one three-dimensional data 400 and a code length are input; and in the encoding step, three-dimensional data 400 is encoded based on the code length, and bitstream 430 including the number of encoded three-dimensional data 400 and the code length is generated.

The method makes it possible to select the code length appropriately, and causes first DNN 150 to generate encoded three-dimensional data 401 having a desired coding amount.

[Decoding Device]

Hereinafter, details of decoding device 200 are described with reference to FIGS. 1 and 7.

<Configuration>

Decoding device 200 is a decoding device which decodes encoded three-dimensional data 401 which has been input, using a DNN (second DNN 250). As illustrated in FIG. 1, decoding device 200 includes obtaining unit 210, second DNN 250, and memory 160.

Obtaining unit 210 is a processing unit which obtains encoded three-dimensional data 401, and inputs encoded three-dimensional data 401 obtained to second DNN 250 (more specifically, third MLP 220). For example, obtaining unit 210 includes a communication interface for communicatively connecting with encoding device 100. Obtaining unit 210 inputs encoded three-dimensional data 401 obtained, to second DNN 250.

Second DNN 250 is a decoding module which decodes encoded three-dimensional data 401 obtained by obtaining unit 210. Second DNN 250 is, for example, a processor for decoding three-dimensional data 400. Based on a control program stored in memory 260 in advance, second DNN 250 decodes encoded three-dimensional data 401 using the MLP (third MLP 220 and fourth MLP 240) to generate decoded three-dimensional data 402.

It is to be noted that decoding device 200 may include a plurality of fourth MLPs 240 according to the number of encoded three-dimensional data 401 obtained by obtaining unit 210. When decoding device 200 is a device which decodes encoded three-dimensional data 401 to generate N data and outputs the N data generated, decoding device 200 includes N fourth MLPs 240.

Second DNN 250 includes, as functional elements, third MLP 220, expansion unit 230, and fourth MLP 240.

Third MLP 220 is a processing unit which transforms encoded three-dimensional data 401 before transform into higher dimensional data by expansion unit 230. For example, when transformed data 410 has been obtained by transforming from D dimensions to L dimensions by second MLP 140 in Step S205 illustrated in FIG. 6, third MLP 220 transforms encoded three-dimensional data 401 from L dimensions to D dimensions. For example, third MLP 220 transforms the dimensions of encoded three-dimensional data 401, based on the code length included in bitstream 430 including encoded three-dimensional data 401. In this way, third MLP 220 performs inverse transform of the input data. The inverse transform is inverse to the transform executed by second MLP 140. Third MLP 220 outputs encoded three-dimensional data 401 having the transformed dimensions to expansion unit 230.

It is to be noted that the number of third MLPs 220 does not need to match the number of fourth MLPs 240, and may be one, for example. In addition, third MLP 220 and fourth MLP 240 are MLPs which execute processing using different parameters.

Expansion unit 230 is a processing unit which increases the number of transformed data having the dimensions transformed by third MLP 220, using a symmetric function. For example, expansion unit 230 executes the processing illustrated in (b) of FIG. 4, thereby transforming the number of data into the number of data which is the same as that of original three-dimensional data 400 to generate transformed data 411 of N rows×D columns.

In addition, for example, when a plurality of data are included in three-dimensional data 400, expansion unit 230 outputs each of the plurality of data to a different one of fourth MLPs 240.

Each fourth MLP 240 transforms transformed data 411 generated by expansion unit 230 into three-dimensional data to generate three-dimensional data 402, and output three-dimensional data 402 generated. For example, decoding device 200 includes fourth MLPs 240 according to the number of three-dimensional data 402 to be decoded. For example, when decoding device 200 decodes encoded three-dimensional data 401 to generate N three-dimensional data 402, decoding device 200 includes N fourth MLPs 240.

It is to be noted that decoding device 200 may store three-dimensional data 402 in memory 260, not-shown storage, or the like by outputting three-dimensional data 402 to memory 260, a storage such as a not-shown HDD. Alternatively, when three-dimensional data 402 is three-dimensional image information such as a map, decoding device 200 may output three-dimensional data 402 onto a not-shown display, or the like which displays three-dimensional images, etc. to display the images based on three-dimensional data 402.

Memory 260 is a storage for storing a control program which is executed by second DNN 250. For example, memory 260 is implemented as a Hard Disk Drive (HDD), a Random Access Memory (RAM) such as a flash memory.

For example, memory 260 stores a parameter (second parameter) which is used for decoding encoded three-dimensional data 401 for decoding executed by third MLP 220 and fourth MLP 240. In other words, third MLP 220 and fourth MLP 240 decode encoded three-dimensional data 401 based on the parameter for decoding encoded three-dimensional data 401.

<Processing Order>

Figure 7:
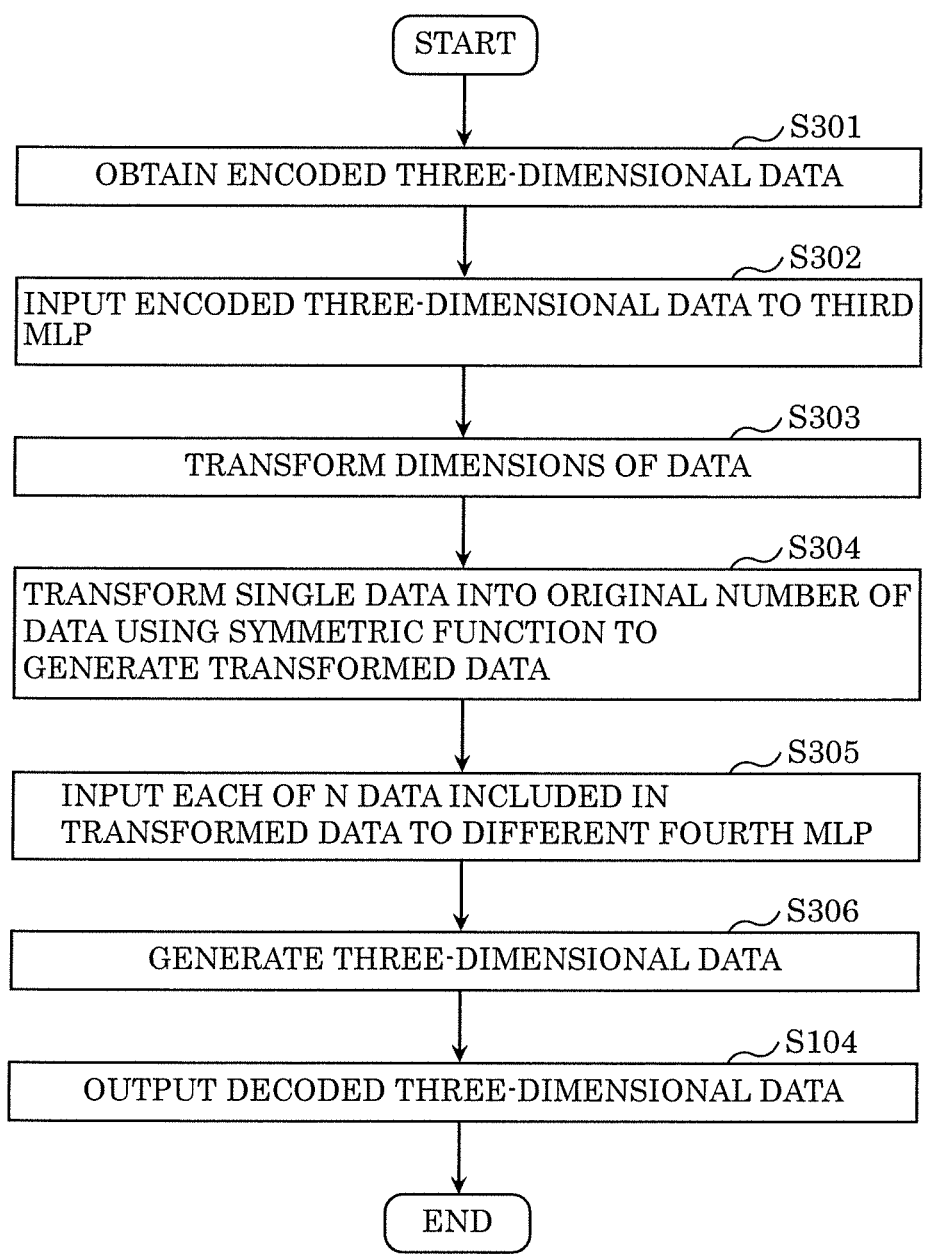
FIG. 7 is a flow chart indicating details of a processing procedure taken by a decoding device according to Embodiment 1.

FIG. 7 is a flow chart indicating details of a processing procedure taken by decoding device 200 according to Embodiment 1. Steps S301 to S306 illustrated in FIG. 7 is a specific example of Step S103 illustrated in FIG. 2. It is to be noted that the flow chart in FIG. 7 indicates processing in the case where decoding device 200 decodes encoded three-dimensional data 401 obtained by encoding three-dimensional data 400 including N data, and decoding device 200 includes N fourth MLPs 240. In addition, N fourth MLPs 240 have the same parameter for decoding encoded three-dimensional data 401.

First, obtaining unit 210 obtains encoded three-dimensional data 401 (Step S301). For example, obtaining unit 210 obtains bitstream 430 including encoded three-dimensional data 401, a code length, the number of data points of three-dimensional data 400. Obtaining unit 210 obtains information necessary for decoding encoded three-dimensional data 401 from bitstream 430 obtained. The information includes the code length of encoded three-dimensional data 401, and the number of data points of three-dimensional data 400.

It is to be noted that, when the code length and the number of data points of three-dimensional data 400 are determined in advance, the code length and the number of data points of three-dimensional data 400 may be stored in memory 260 in advance. In this case, obtaining unit 210 may obtain the code length and the number of data points of three-dimensional data 400 stored in memory 260.

Next, obtaining unit 210 executes a second input step of inputting encoded three-dimensional data 401 obtained by obtaining unit 210 to third MLP 220 (Step S302).

Next, third MLP 220 transforms the dimensions of encoded three-dimensional data 401 (Step S303). For example, third MLP 220 transforms encoded three-dimensional data 401 transformed into data of 1 row×L columns in Step S205 indicated in FIG. 6 into data of 1 row×D columns, based on the code length included in bitstream 430. In this way, third MLP 220 performs inverse transform of the input data. The inverse transform is inverse to the transform executed by second MLP 140.

Next, expansion unit 230 generates transformed data 411 of N rows×D columns obtained by expanding the data of 1 row×D columns generated in Step S303 to N data whose number is the same as original three-dimensional data 400, using a symmetric function (more specifically, a max function) along every column thereof (that is, for each of the D columns) (Step S304).

Next, expansion unit 230 inputs each of the N data included in transformed data 411 generated to a different one of fourth MLPs 240 (Step S305). For example, in Step S305, expansion unit 230 inputs one of the N data included in transformed data 411 to one of fourth MLPs 240.

Next, fourth MLP 240 transforms D-dimensional data input to generate three-dimensional data 402 (Step S306). It is to be noted that when decoding device 200 includes a plurality of fourth MLPs 240, the plurality of fourth MLPs 240 transform the D-dimensional data input into three-dimensional data. In this case, a not-shown composition unit which collectively transforms three-dimensional data 402 transformed respectively by the plurality of fourth MLPs 240 into data of N rows×D columns.

Next, fourth MLP 240 executes a second output step of outputting three-dimensional data 402 decoded (Step S104).

Effects, Etc.

As described above, decoding device 200 includes a processor and memory 260. Using memory 260, the processor inputs, to second DNN 250 encoded three-dimensional data 400 obtained by encoding three-dimensional data 400 including three-dimensional coordinate data, decodes encoded three-dimensional data 401 by second DNN 250 to generate three-dimensional data 402, and outputs three-dimensional data 402 generated. More specifically, decoding device 200 includes: obtaining unit 210 which obtains encoded three-dimensional data 401 obtained by encoding three-dimensional data 400 including the three-dimensional coordinate data; and second DNN 250 which decodes encoded three-dimensional data 401 obtained by obtaining unit 210 to generate three-dimensional data 402 and outputs three-dimensional data 402 generated.

In addition, the decoding method executed by decoding device 200 according to Embodiment 1 includes: a second input step of inputting, to second DNN 250, encoded three-dimensional data 401 obtained by encoding three-dimensional data 400 including three-dimensional coordinate data; a decoding step of decoding encoded three-dimensional data 401 by second DNN 250 to generate three-dimensional data 402; and a second output step of outputting three-dimensional data 402.

According to the method, three-dimensional data (more specifically, encoded three-dimensional data 401) is to be decoded using second DNN 250. Second DNN 250 makes it possible to decode the compressed low-dimensional data to generate original high-dimensional data with high reproducibility. For this reason, the use of second DNN 250 makes it possible to decode encoded three-dimensional data 401 to generate three-dimensional data 402 which is closer to the three-dimensional data before being encoded than one obtainable using a conventional geometric method.

Information processing system 300 includes a processor and a memory. Using the memory, the processor: inputs three-dimensional data 400 including the three-dimensional coordinate data to first DNN 150; encodes three-dimensional data 400 by first DNN 150 to generate encoded three-dimensional data 401; inputs encoded three-dimensional data 401 generated to second DNN 250; and decode encoded three-dimensional data 401 by second DNN 250 to generate three-dimensional data 402; and outputs three-dimensional data 402 generated. More specifically, information processing system 300 includes: obtaining unit 110 which obtains three-dimensional data 400 including three-dimensional coordinate data; first DNN 150 which encodes three-dimensional data 400 obtained by obtaining unit 210 to generate encoded three-dimensional data 401; and second DNN 250 which decodes encoded three-dimensional data 401 generated by first DNN to generate three-dimensional data 402, and outputs three-dimensional data 402 generated.

In addition, the information processing method executed by information processing system 300 according to Embodiment 1 includes: a first input step of inputting, to first DNN 150, three-dimensional data 400 including three-dimensional coordinate data; an encoding step of encoding three-dimensional data 400 by first DNN 150 to generate encoded three-dimensional data 401; a second input step of inputting encoded three-dimensional data 401 generated to second DNN 250; a decoding step of decoding encoded three-dimensional data 401 by second DNN 250 to generate decoded three-dimensional data 402; and an output step of outputting three-dimensional data 402 generated.

According to this, three-dimensional data 400 are encoded and decoded using first DNN 150 and second DNN 250. First DNN 150 makes it possible to efficiently transform high-dimensional data (which is, for example, data of at least three dimensions) into low-dimensional representation as in the case of compression of two-dimensional data, etc. For this reason, the use of first DNN 150 makes it possible to encode three-dimensional data with a compression rate higher than in a conventional geometric method. In addition, three-dimensional data 400 is compressed efficiently. In this way, when transmitting three-dimensional data 400 from a server device to a device which is used by a user, it is possible to reduce the communication load to be required. Alternatively, it is possible to reduce the required capacity of a storage device which stores three-dimensional data 400. According to the method, encoded three-dimensional data 401 is to be decoded using second DNN 250. Second DNN 250 makes it possible to decode the compressed low-dimensional data to generate original high-dimensional data with high reproducibility. For this reason, the use of second DNN 250 makes it possible to decode encoded three-dimensional data 401 to generate three-dimensional data 402 which is closer to the three-dimensional data before being encoded than one obtainable using a conventional geometric method. In this way, the information processing method according to the aspect of the present disclosure makes it possible to encode three-dimensional data 400 effectively, and decode the encoded three-dimensional data effectively.

Embodiment 2

Next, an information processing system according to Embodiment 2 is described. It is to be noted that, in the descriptions of the information processing system according to Embodiment 2, differences from information processing system 300 according to Embodiment 1 are mainly described, and descriptions of common elements may be partly simplified or omitted.

[Configuration]

First, the information processing system according to Embodiment 2 is described with reference to FIG. 8.

Figure 8:
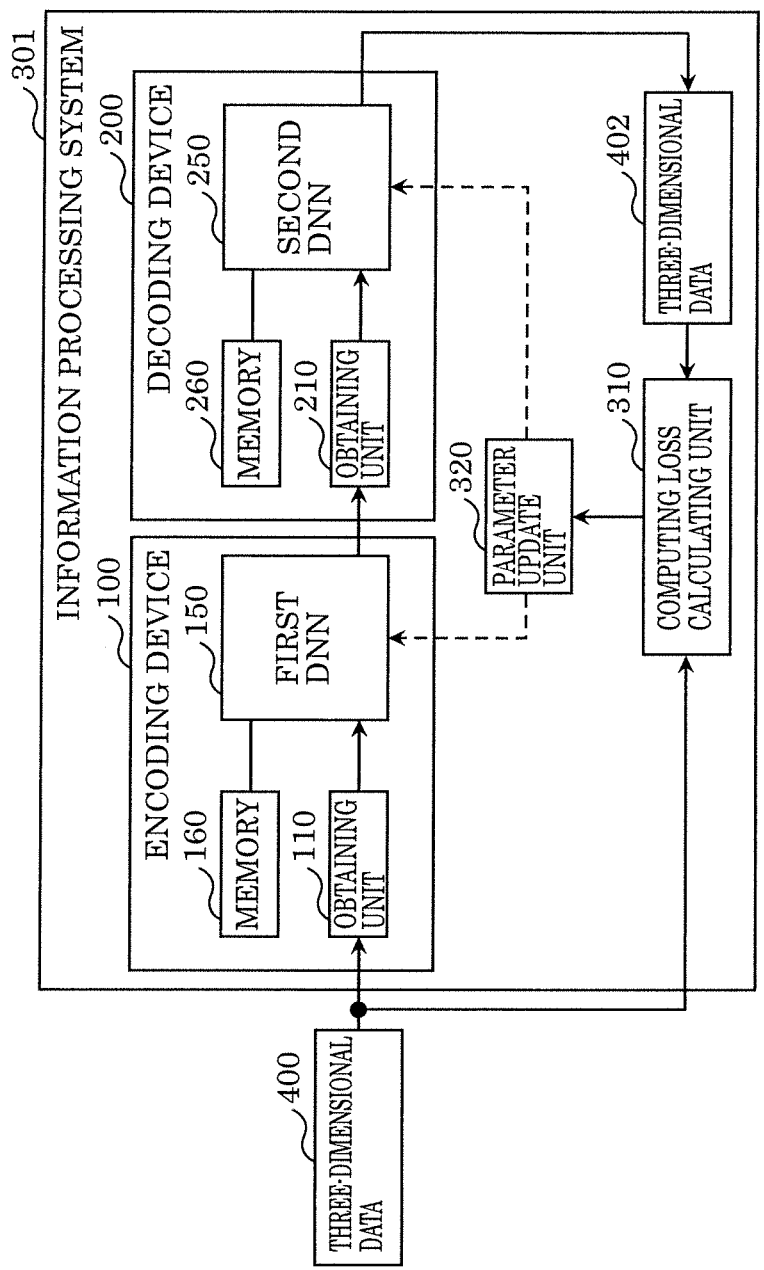
FIG. 8 is a block diagram for illustrating a functional configuration of an information processing system according to Embodiment 2.

FIG. 8 is a block diagram for illustrating a functional configuration of information processing system 301 according to Embodiment 2.

As illustrated in FIG. 8, information processing system 301 includes: encoding device 100; decoding device 200; computing loss calculating unit 310; and parameter update unit 320. In this way, information processing system 301 is different from information processing system 300 according to Embodiment 1, in including computing loss calculating unit 310 and parameter update unit 320.

Computing loss calculating unit 310 is a processing unit which compares three-dimensional data 400 and three-dimensional data 402. More specifically, computing loss calculating unit 310 compares the two data one of which is three-dimensional data 400 which is input to encoding device 100 and the other is three-dimensional data 402 generated by decoding device 200 decoding encoded three-dimensional data 401. Encoded three-dimensional data 401 is generated by encoding device 100 encoding three-dimensional data 400. For example, computing loss calculating unit 310 calculates a computing loss which is the difference between three-dimensional data 400 and three-dimensional data 402.

For example, computing loss calculating unit 310 is configured with: a memory for storing a control program for causing computing loss calculating unit 310 to execute processing thereof; and a processor which executes the control program.

Parameter update unit 320 is a processing unit which updates a first parameter to be used for encoding by first DNN 150 and a second parameter to be used for decoding by second DNN 250, based on the computing loss calculated by computing loss calculating unit 310. In other words, computing loss calculating unit 310 and parameter update unit 320 enable training of first DNN 150 and second DNN 250 by causing first DNN 150 and second DNN 250 to update parameters for use based on the computing loss calculated. In other words, the parameter for encoding by encoding device 100 and the parameter for decoding by decoding device 200 are updated iteratively through a process called back-propagation.

For example, parameter update unit 320 is configured with: a memory for storing a control program for causing parameter update unit 320 to execute processing thereof; and a processor which executes the control program.

It is to be noted that computing loss calculating unit 310 and parameter update unit 320 may be implemented using the same processors and memories or mutually different processors and memories.

For example, information processing system 301 updates, that is, optimizes, the parameters of respective first DNN 150 and second DNN 250 using a plurality of three-dimensional data 400 by computing loss calculating unit 310. In this way, information processing system 301 is capable of encoding three-dimensional data 400 and decoding encoded three-dimensional data 401 effectively.

[Processing Procedure]

Figure 9:
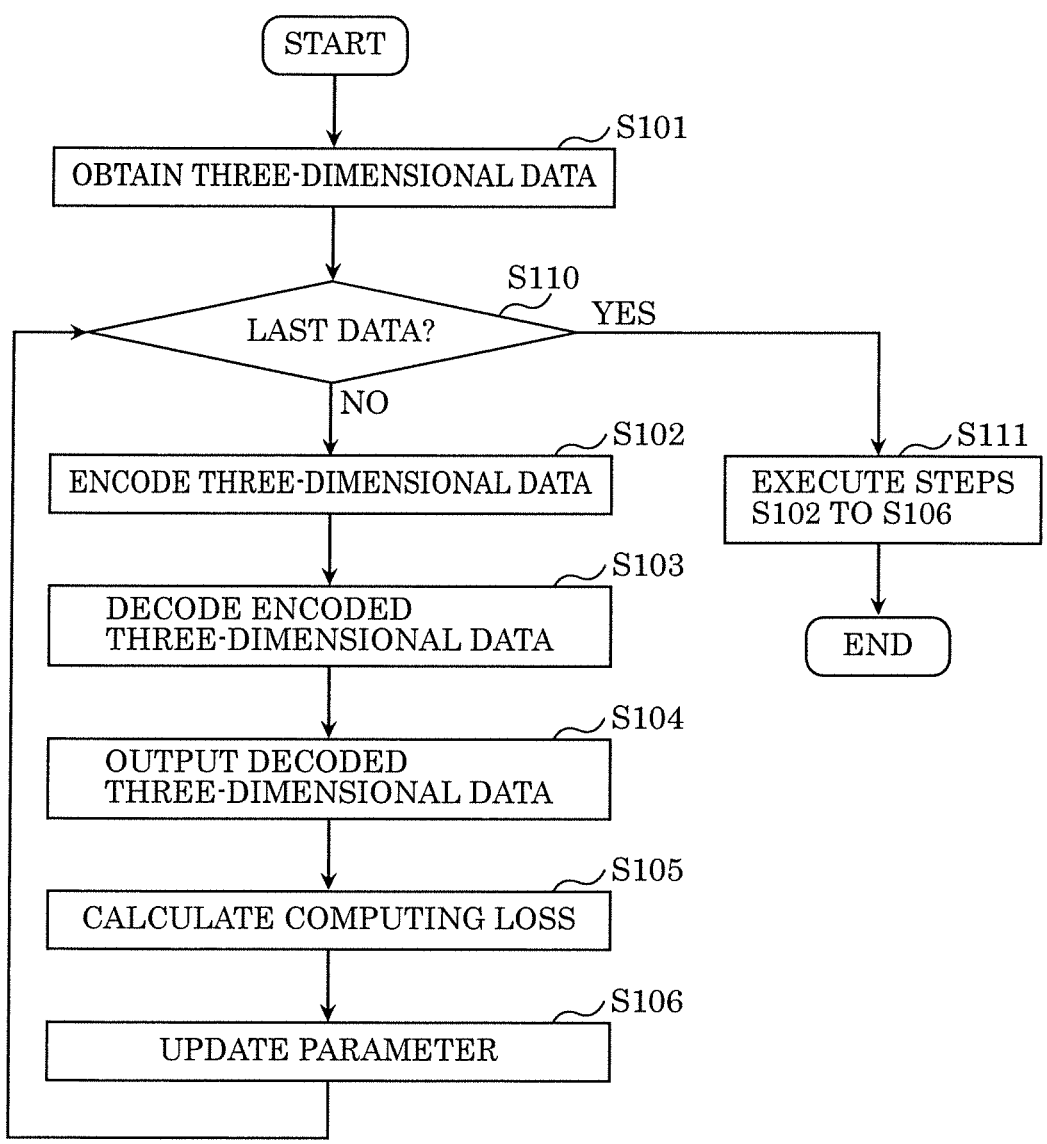
FIG. 9 is a flow chart for illustrating a processing procedure of processing executed by the information processing system according to Embodiment 2.
Figure 10:
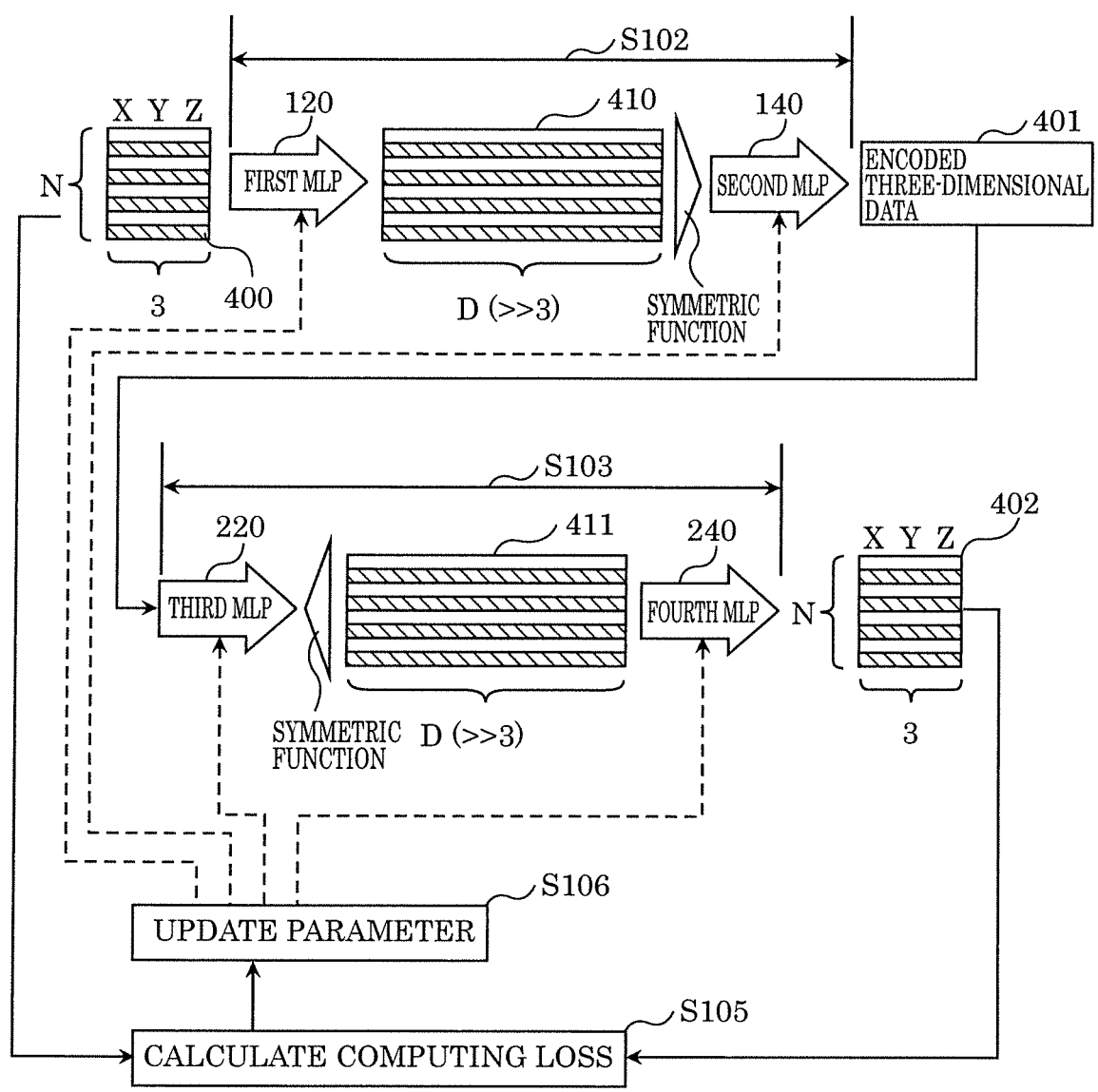
FIG. 10 is a flow chart for illustrating a processing procedure of processing executed by the information processing system according to Embodiment 2.

FIG. 9 is a flow chart for illustrating a processing procedure of processing executed by information processing system 301 according to Embodiment 2. FIG. 10 is a flow chart for illustrating a processing procedure of processing executed by information processing system 301 according to Embodiment 2.

It is to be noted that, FIG. 9 indicates a case in which parameters of respective first DNN 150 and second DNN 250 are updated using a plurality of three-dimensional data 400.

As indicated in FIG. 9, next to Step S101, for example, first DNN 150 determines whether three-dimensional data 400 which is input is last three-dimensional data 400 (Step S110). An identifier for determining whether three-dimensional data 400 which is input is last three-dimensional data 400 may be included in three-dimensional data 400 which is input, in order to allow first DNN 150 to make the determination in Step S110. Alternatively, encoding device 100 may include a counter (processing unit) which counts an update count of each parameter and count information indicating an update count of each parameter, in order to allow first DNN 150 to make the determination in Step S110.

When it is determined that three-dimensional data 400 which is input is not last three-dimensional data 400 (No in Step S110), encoding device 100 executes Step S102, and decoding device 200 executes Steps S103 and S104. It is to be noted that, in Step S104, decoding device 200 outputs three-dimensional data 402 to computing loss calculating unit 310.

Next to Step S104, computing loss calculating unit 310 executes a first calculation step of calculating a computing loss which is the difference between three-dimensional data 400 and three-dimensional data 402 (Step S105).

Next, parameter update unit 320 updates a first parameter for first DNN 150 encoding three-dimensional data 400 and a second parameter for second DNN 250 decoding encoded three-dimensional data 401 (see FIG. 1), based on the computing loss calculated in Step S105 (Step S106). More specifically, in Step S106, as illustrated in FIG. 10, parameter update unit 320 updates parameters for first MLP 120 and second MLP 140 encoding three-dimensional data 400 and parameters for third MLP 220 and fourth MLP 240 decoding encoded three-dimensional data 401. In this way, information processing system 301 executes a training step of optimizing the first parameter for first DNN 150 encoding three-dimensional data 400 and a second parameter for second DNN 250 decoding encoded three-dimensional data 401, based on the computing loss calculated in Step S105.

Next, information processing system 301 returns processing to Step S110.

When it is determined that three-dimensional data 400 which is input is last three-dimensional data 400, information processing system 301 executes Steps S102 to S106 and makes a determination in Step S110. When it is determined that three-dimensional data 400 which is input is last three-dimensional data 400 (Yes in Step S110), information processing system 301 executes Steps S102 to S106 and ends the processing.

Effects, Etc.

As described above, the information processing method executed by information processing system 301 according to Embodiment 2 further includes, for example: the first calculation step of calculating the computing loss which is the difference between three-dimensional data 400 and three-dimensional data 402; and the training step of updating the first parameter for first DNN 150 encoding three-dimensional data 400 and the second parameter for second DNN 250 decoding encoded three-dimensional data 401.

The method makes it possible to update the parameters which first DNN 150 and second DNN 250 use for encoding and decoding, respectively, so that first DNN 150 and second DNN 250 can encode and decode three-dimensional data 400 effectively, respectively.

Embodiment 3

Next, an information processing system according to Embodiment 3 is described. It is to be noted that, in the descriptions of the information processing system according to Embodiment 3, differences from information processing system 301 according to Embodiment 2 are mainly described, and descriptions of common elements may be partly simplified or omitted.

[Configuration]

First, the information processing system according to Embodiment 3 is described with reference to FIG. 11.

Figure 11:
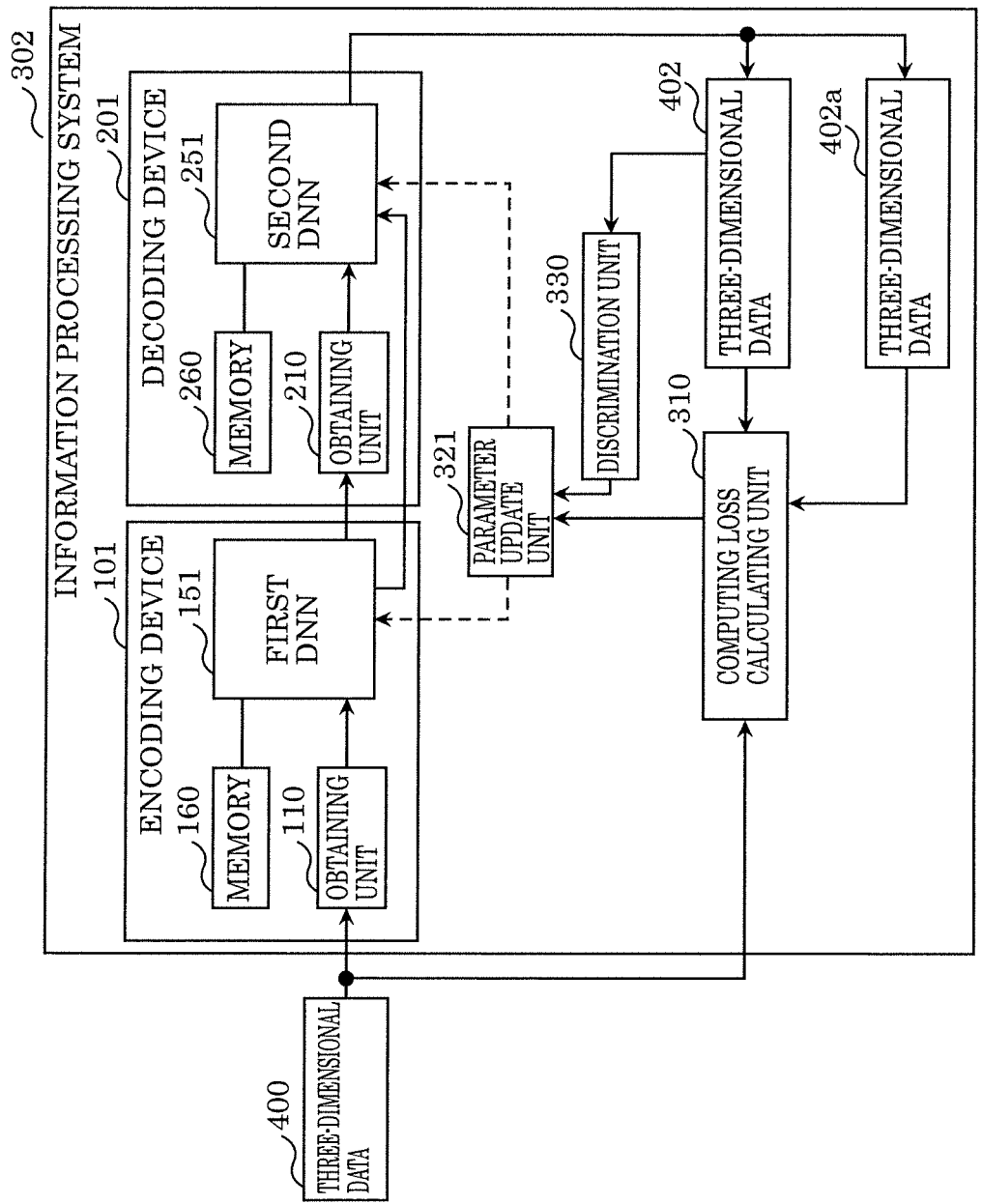
FIG. 11 is a block diagram for illustrating a functional configuration of an information processing system according to Embodiment 3.

FIG. 11 is a block diagram for illustrating a functional configuration of information processing system 302 according to Embodiment 3.

As illustrated in FIG. 11, information processing system 302 includes: encoding device 101; decoding device 201; computing loss calculating unit 310; parameter update unit 321: and discrimination unit 330. In this way, information processing system 302 is different from information processing system 301 according to Embodiment 2 in including discrimination unit 330. In addition, information processing system 302 is partly different from information processing system 301 according to Embodiment 2 in the processing executed by encoding device 101, decoding device 201, and parameter update unit 321.

Encoding device 101 includes obtaining unit 110, first DNN 151, and memory 160. For example, first DNN 151 includes, as functional elements, first MLP 120, compression unit 130, and second MLP 140, as in first DNN 150 illustrated in FIG. 1. Here, first DNN 151 outputs, to second DNN 251, data (for example, transformed data 410) which is obtained during encoding of three-dimensional data 400 to generate encoded three-dimensional data 401. In other words, first DNN 151 executes what is called skip connection. It is to be noted that an element which outputs, to second DNN 251, data (for example, transformed data 410) which is obtained during encoding of three-dimensional data 400 to generate encoded three-dimensional data 401 is not particularly limited. For example, the element may be first MLP 120, or second MLP 140.

Decoding device 201 includes obtaining unit 210, second DNN 251, and memory 260. For example, second DNN 251 includes, as functional elements, third MLP 220, compression unit 130, and fourth MLP 240, as in second DNN 250 illustrated in FIG. 1. Here, second DNN 251 encodes encoded three-dimensional data, based on data (for example, transformed data 410) which is obtained during encoding of three-dimensional data 400 input from first DNN 151 to generate encoded three-dimensional data 401. For example, second DNN 251 changes (updates) the parameter for decoding based on the transformed data input. It is to be noted that the parameter to be changed by second DNN 251 may be a parameter for third MLP 220 or a parameter for fourth MLP 240.

Discrimination unit 330 is a processing unit which calculates an adversarial loss indicating a similarity between three-dimensional data 400 and three-dimensional data 402. More specifically, discrimination unit 330 is a discriminator which calculates an adversarial loss indicating to what degree three-dimensional data 402 resembles a real object indicated by three-dimensional data 400. For example, discrimination unit 330 is what is called Generative Adversarial Network (GANs) which determines whether an object indicated by three-dimensional data 402 is false when the object indicated by three-dimensional data 400 is true by comparing three-dimensional data 402 and the object indicated by three-dimensional data 400.

For example, discrimination unit 330 is configured with: a memory for storing a control program for causing discrimination unit 330 to execute processing thereof; and a processor which executes the control program.

Parameter update unit 321 is different from parameter update unit 320 in updating parameters for first DNN 151 and second DNN 251, based on not only the computing loss calculated by computing loss calculating unit 310 but also the adversarial loss calculated by discrimination unit 330. In other words, parameter update unit 321 updates the first parameter used for encoding by first DNN 151 and the second parameter used for decoding by second DNN 251, based on the computing loss calculated by computing loss calculating unit 310 and the adversarial loss calculated by discrimination unit 330.

It is to be noted that computing loss calculating unit 310, parameter update unit 321, and discrimination unit 330 may be implemented using the same processors and memories or mutually different processors and memories.

[Processing Procedure]

Figure 12:
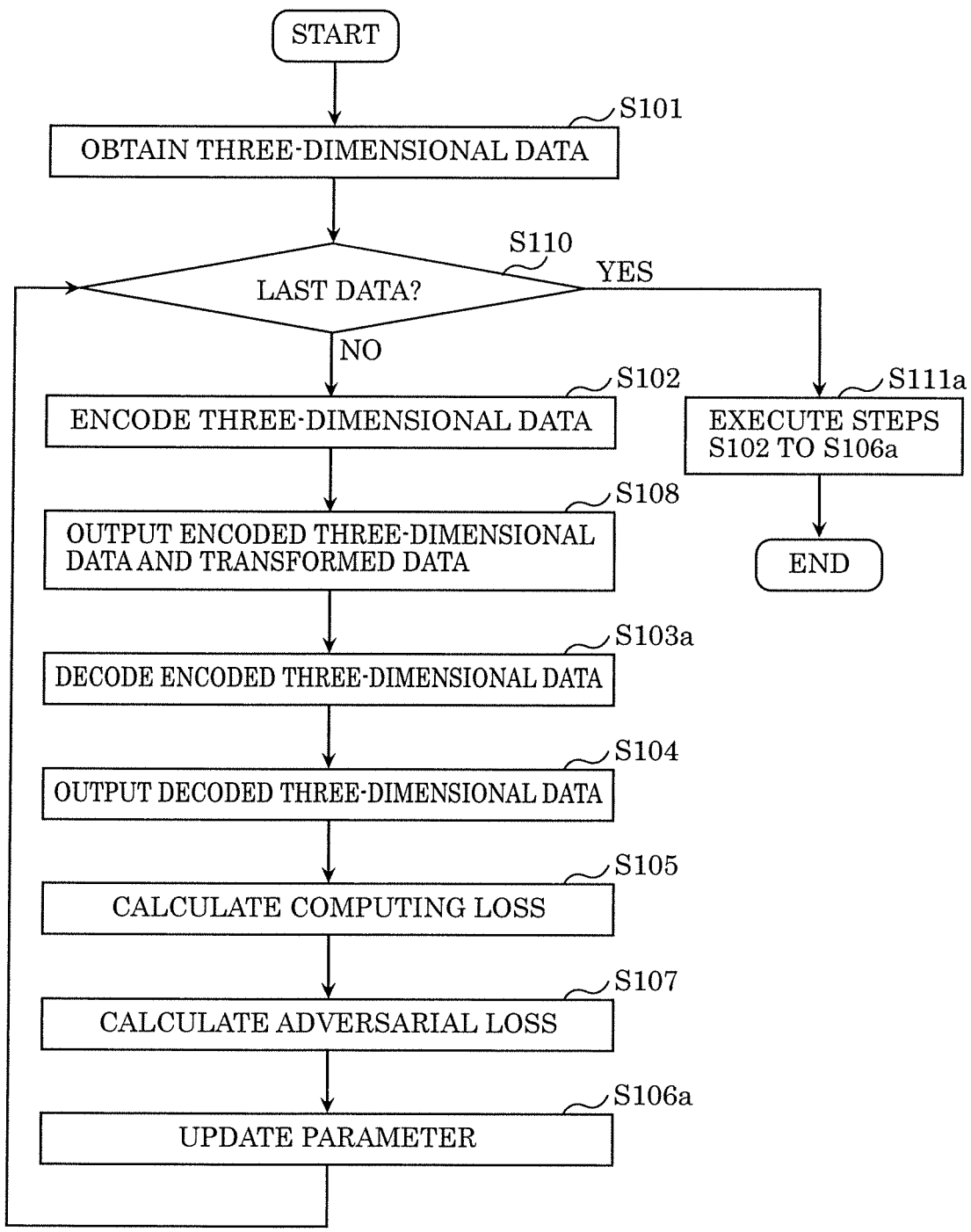
FIG. 12 is a flow chart for illustrating a processing procedure of processing executed by the information processing system according to Embodiment 3.
Figure 13:
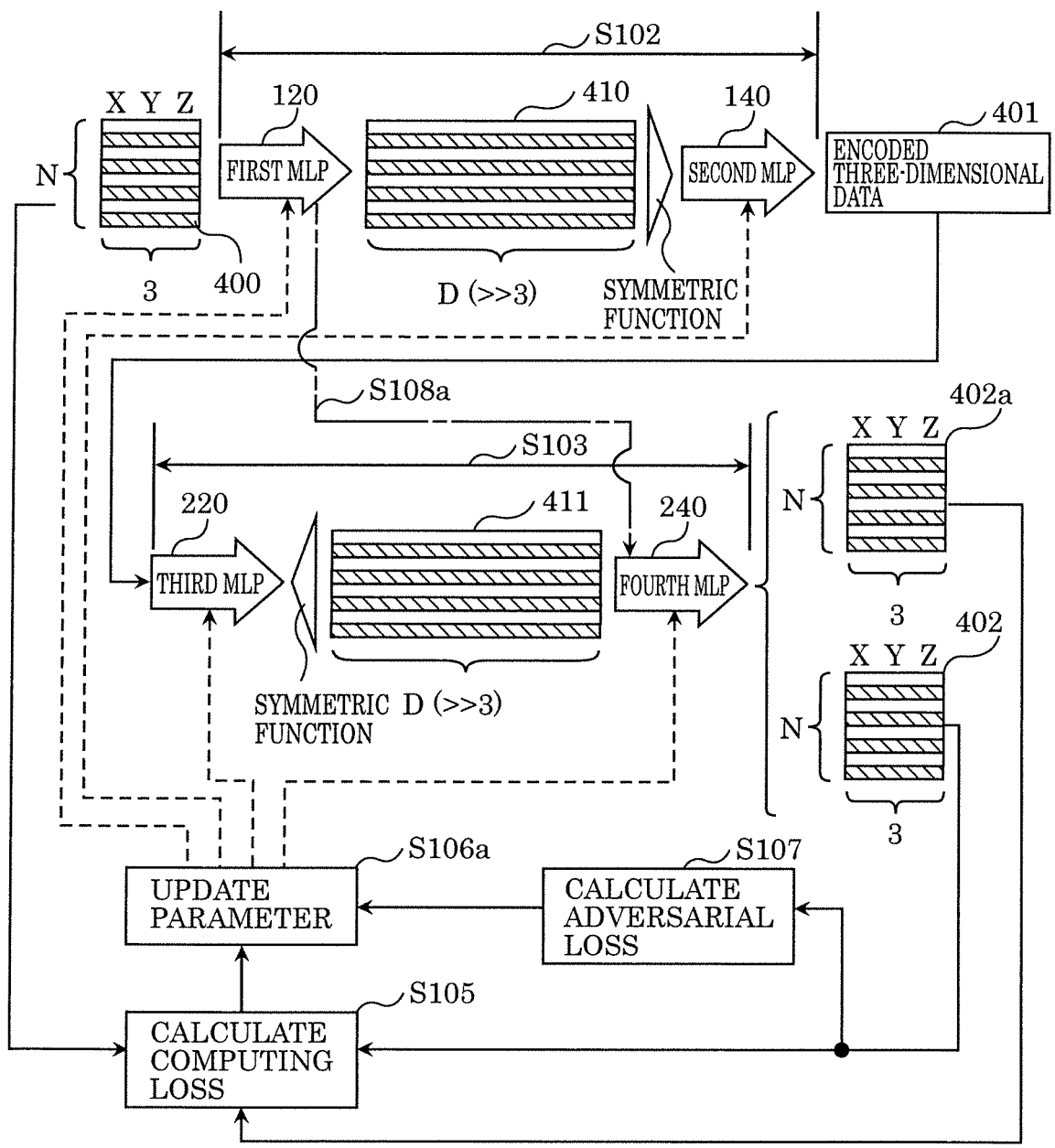
FIG. 13 is a flow chart for illustrating a processing procedure of processing executed by the information processing system according to Embodiment 3.

FIG. 12 is a flow chart for illustrating a processing procedure of processing executed by information processing system 302 according to Embodiment 3. FIG. 13 is a flow chart for illustrating a processing procedure of processing executed by information processing system 302 according to Embodiment 3.

It is to be noted that, FIG. 12 indicates a case in which parameters of respective first DNN 151 and second DNN 251 are updated using a plurality of three-dimensional data 400.

As indicated in FIG. 12, next to Step S101, for example, first DNN 151 determines whether three-dimensional data 400 which is input is last three-dimensional data 400 (Step S110).

When it is determined that three-dimensional data 400 which is input is not last three-dimensional data 400 (No in Step S110), first DNN 151 executes Step S102.

Next, first DNN 151 outputs encoded three-dimensional data 401 and transformed data 410 (Step S108). In Step S108, as illustrated in FIG. 13, for example, first MLP 120 executes skip connection for outputting transformed data 410 to fourth MLP 240 (Step S108a). More specifically, in Step S108a, first DNN 151 inputs transformed data 410 to fourth MLP 240. Transformed data 410 has not yet been subjected to processing for encoding to be executed at a last stage of processing executed by first MLP 120 (for example, processing executed by compression unit 130 and second MLP 140) and processing for decoding to be executed at a former stage of processing executed by fourth MLP 240 (for example, processing executed by third MLP 220 and expansion unit 230). Through the execution of skip connection indicated in Step S108a, decoding device 201 (more specifically, fourth MLP 240) generates three-dimensional data 402a by processing transformed data 410. With reference to FIG. 12 again, next, decoding device 201 decodes encoded three-dimensional data 401 based on transformed data 410 input in Step S108a (Step S103a). More specifically, in Step S103a, decoding device 201 generates three-dimensional data 402 by processing transformed data 411, and generates three-dimensional data 402a by processing transformed data 410 input in Step S108a similarly to the processing of transformed data 410 executed.

Next, decoding device 201 outputs three-dimensional data 402 and three-dimensional data 402a to computing loss calculating unit 310 and discrimination unit 330 (Step S104). For example, in Step S103a, transformed data 410 of N rows×D columns output by first MLP 120 is input to fourth MLP 240. In Step S104, fourth MLP 240 outputs three-dimensional data 402 of N rows×3 columns (xyz coordinates which are three-dimensional coordinates) to computing loss calculating unit 310 and discrimination unit 330. In Step S104, fourth MLP 240 outputs three-dimensional data 402a of N rows×3 columns (xyz coordinates which are three-dimensional coordinates) to computing loss calculating unit 310 and discrimination unit 330.

Next, computing loss calculating unit 310 executes a first calculation step of calculating a computing loss which is the difference between three-dimensional data 400 and three-dimensional data 402 (Step S105). In addition, in Step S105, computing loss calculating unit 310 calculates a computing loss which is the difference between three-dimensional data 400 and three-dimensional data 402a.

Next, discrimination unit 330 executes a second calculation step of calculating an adversarial loss indicating a similarity between three-dimensional data 400 and three-dimensional data 402a (Step S107). It is to be noted that discrimination unit 330 may obtain three-dimensional data 400 from a not-shown outside device from which encoding device 101 obtains three-dimensional data 400, or may include three-dimensional data 400 in a storage such as a not-shown HDD in advance, in order to calculate the adversarial loss.

Next, parameter update unit 321 updates a first parameter for first DNN 151 encoding three-dimensional data 400 and a second parameter for second DNN 251 decoding encoded three-dimensional data 401, based on the computing loss calculated in Step S105 and the adversarial loss calculated in Step S107 (Step S106a). More specifically, in Step S106a, as illustrated in FIG. 13, parameter update unit 321 updates parameters for first MLP 120 and second MLP 140 encoding three-dimensional data 400 and parameters for third MLP 220 and fourth MLP 240 decoding encoded three-dimensional data 401. In this way, information processing system 302 executes a training step of optimizing the first parameter for first DNN 151 encoding three-dimensional data 400 and a second parameter for second DNN 251 decoding encoded three-dimensional data 401, based on the computing loss calculated in Step S105 and the adversarial loss calculated in Step S107.

Next, information processing system 302 returns processing to Step S110.

When it is determined that three-dimensional data 400 which is input is not last three-dimensional data 400, information processing system 302 executes Steps S102 to S106a and makes a determination in Step S110. When first DNN 151 determines that three-dimensional data 400 which is input is last three-dimensional data 400 (Yes in Step S110), information processing system 302 executes Steps S102 to S106a and ends the processing.

Effects, Etc.

As described above, the information processing method executed by information processing system 302 according to Embodiment 3 further includes the second calculation step of calculating the adversarial loss indicating the similarity between three-dimensional data 400 and three-dimensional data 402. In addition, in the training step, the first parameter and the second parameter are updated based on the computing loss and the adversarial loss.

According to this, it is possible to update the parameters to be used for encoding and decoding by first DNN 151 and second DNN 251 so that first DNN 151 and second DNN 251 can encode and decode the three-dimensional data further effectively.

In addition, through the execution of skip connection, computing loss calculating unit 310 may calculate a computing loss of three-dimensional data 402a subjected to the processing executed by first MLP 120 and the processing executed by fourth MLP 240. For this reason, parameter update unit 321 may update respective parameters for first DNN 151 (specifically, first MLP 120) and second DNN 251 (specifically, fourth MLP 240) with an increased accuracy. In other words, fourth MLP 240 may output, to computing loss calculating unit 310, two three-dimensional data which are three-dimensional data 402 generated by processing transformed data 411 and three-dimensional data 402a generated by processing transformed data 410. In this case, computing loss calculating unit 310 may calculate a computing loss for each of these two three-dimensional data 402 and 402a. In addition, in this case, parameter update unit 320 may update the parameters for respective first DNN 151 and second DNN 251, based on the computing losses thereof calculated by computing loss calculating unit 310.

In this way, parameter update unit 321 may update respective parameters for first DNN 151 and second DNN 251 with a further increased accuracy.

It is to be noted that fourth MLP 240 may output three-dimensional data 402a to discrimination unit 330. In this case, discrimination unit 330 may calculate an adversarial loss indicating a similarity between three-dimensional data 400 and three-dimensional data 402a. In addition, in this case, parameter update unit 321 may further update the first parameter for first DNN 151 encoding three-dimensional data 400 and the second parameter for second DNN 251 decoding encoded three-dimensional data 401, based on the adversarial loss indicating the similarity between three-dimensional data 400 and three-dimensional data 402a. According to this, it is possible to update the parameters to be used for encoding and decoding by first DNN 151 and second DNN 251 so that first DNN 151 and second DNN 251 can encode and decode three-dimensional data 400 more effectively.

Embodiment 4

Next, an information processing system according to Embodiment 4 is described. It is to be noted that, in the descriptions of the information processing system according to Embodiment 4, differences from information processing systems 300 to 302 according to Embodiments 1 to 3 are mainly described, and descriptions of common elements may be partly simplified or omitted.

[Configuration]

The configuration of the information processing system according to Embodiment 4 is described with reference to FIG. 14.

Figure 14:
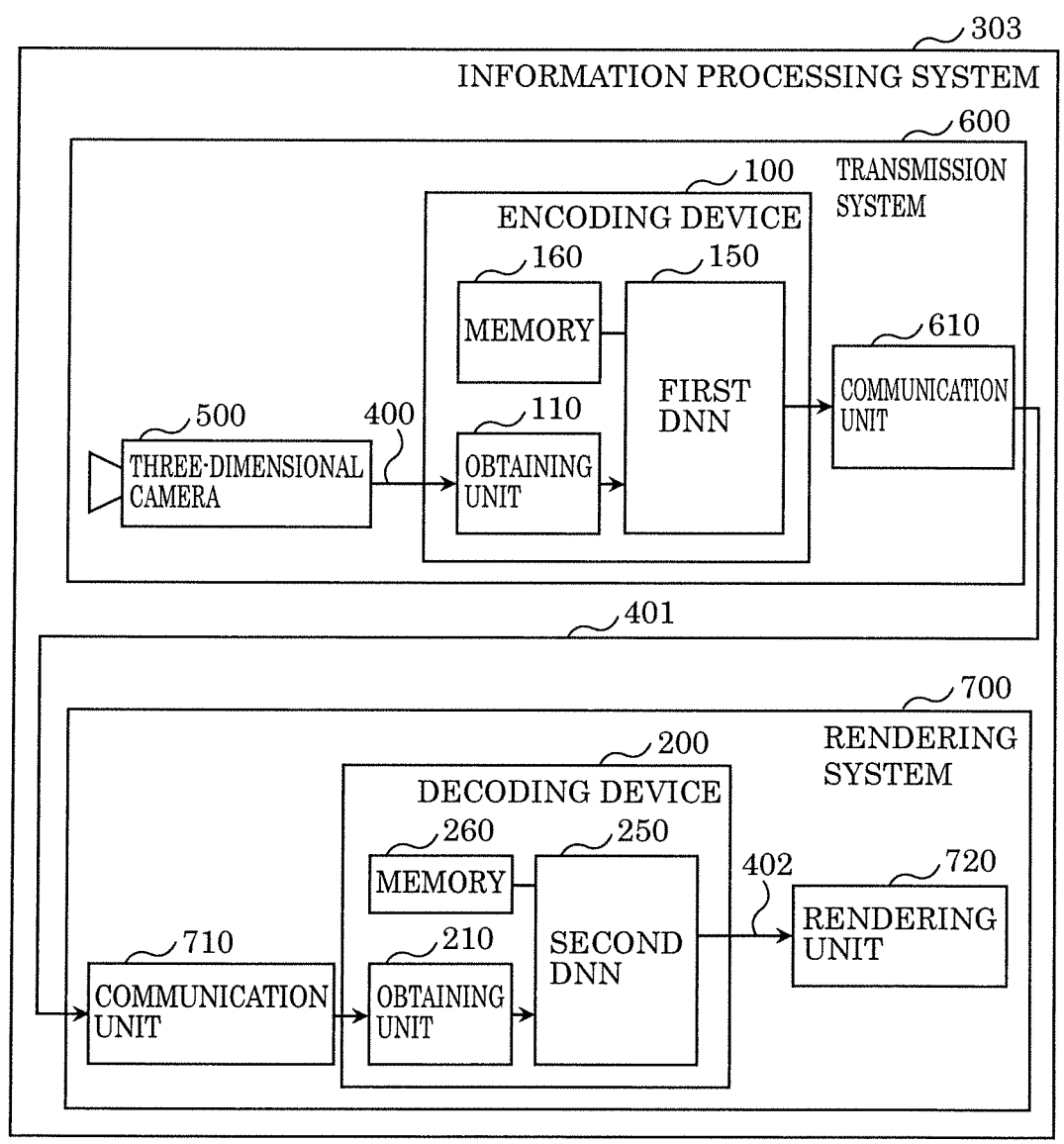
FIG. 14 is a block diagram for illustrating a functional configuration of an information processing system according to Embodiment 4.

FIG. 14 is a block diagram for illustrating a functional configuration of information processing system 303 according to Embodiment 4.

Information processing system 303 captures images of an object targeted by three-dimensional camera 500, or the like to generate three-dimensional data 400 representing three-dimensional images, encodes generated three-dimensional data 400 by encoding device 100, decodes the encoding result by decoding device 200, and displays the three-dimensional images represented by three-dimensional data 400. In this way, information processing system 303 is a system indicating one example of a use case in which encoding device 100 and decoding device 200 are used.

Information processing system 303 includes transmission system 600 and rendering system 700.

Transmission system 600 captures images of a target object using three-dimensional camera 500 to generate three-dimensional data 400 representing three-dimensional images, encodes generated three-dimensional data 400 using encoding device 100 to generate encoded three-dimensional data 401, and transmits generated encoded three-dimensional data 401 to rendering system 700.

Transmission system 600 includes three-dimensional camera 500, encoding device 100, and communication unit 610.

Three-dimensional camera 500 is an image capturing device which captures images of the target object to generate three-dimensional data 400 representing three-dimensional images. Three-dimensional camera 500 is communicatively connected to encoding device 100, and transmits generated three-dimensional data 400 to encoding device 100.

For example, three-dimensional camera 500 is disposed in a moving body such as a vehicle, a motor bicycle, etc. Three-dimensional camera 500 may capture images of landscapes around the moving body while being moved by the moving body to generate three-dimensional data 400 representing a three-dimensional map.

Communication unit 610 is a communication interface for transmitting encoded three-dimensional data 401 generated by encoding device 100 to rendering system 700. Communication unit 610 is, for example, communicatively connected to communication unit 710. It is to be noted that communication unit 610 and communication unit 710 may be communicatively connected wirelessly or wiredly.

Rendering system 700 is a system which decodes encoded three-dimensional data 401 received from transmission system 600 to generate three-dimensional data 402, and displays the three-dimensional images represented by generated three-dimensional data 402.

Rendering system 700 includes communication unit 710, decoding device 200, and rendering unit 720.

Communication unit 710 is a communication interface for receiving encoded three-dimensional data 401 transmitted from transmission system 600.

Communication unit 710 is, for example, communicatively connected to communication unit 610.

Rendering unit 720 is a display device which displays three-dimensional images based on three-dimensional data 402 generated by decoding device 200. For example, rendering unit 720 includes: a display for displaying videos; and image processing unit which displays three-dimensional images based on three-dimensional data 402 on the display. For example, the image processing unit is configured with: a memory for storing a control program for causing the image processing unit to execute processing thereof; and a processor which executes the control program.

As described above, according to information processing system 303, for example, it is possible to manage three-dimensional data 400 by, for example, a server including transmission system 600, and transmit encoded three-dimensional data 401 to a plurality of users (clients) each including a communication terminal, or the like including rendering system 700. For example, transmission system 600 is capable of storing encoded three-dimensional data 401 obtained by reducing the data amount of three-dimensional data 400. Accordingly, for example, transmission system 600 is capable of reducing a required capacity of a not-shown storage, or the like to store the data. In addition, transmission system 600 is capable of reducing the communication data amount for transmitting not three-dimensional data 400 but encoded three-dimensional data 401 having a reduced data amount to rendering system 700. In addition, rendering system 700 is capable of decoding encoded three-dimensional data 401 efficiently with a high reproducibility, that is, effectively.

Variation

Although transmission system 600 included in information processing system 303 according to Embodiment 4 includes three-dimensional camera 500 in order to generate three-dimensional data 400, it is to be noted that a device for generating three-dimensional data 400 is not limited to three-dimensional camera 500.

Next, a transmission system according to Embodiment 4 is described. It is to be noted that, in the descriptions of the transmission system according to a variation of Embodiment 4, differences from transmission system 600 included in information processing system 303 according to Embodiment 4 are mainly described, and descriptions of common elements may be partly simplified or omitted.

Figure 15:
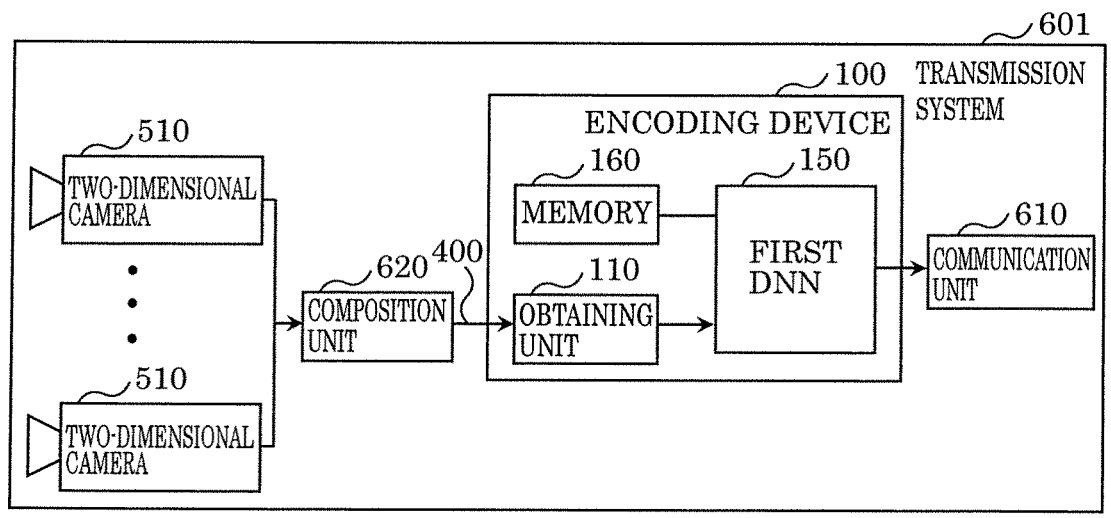
FIG. 15 is a block diagram for illustrating a transmission system according to a variation of Embodiment 4.

FIG. 15 is a block diagram for illustrating transmission system 601 according to this variation of Embodiment 4.

As illustrated in FIG. 15, transmission system 601 includes a plurality of two-dimensional cameras 510, composition unit 620, encoding device 100, and communication unit 610. Transmission system 601 is different from transmission system 600 according to Embodiment 4 in not including three-dimensional camera 500 and including the plurality of two-dimensional cameras 510, and composition unit 620.

Each two-dimensional camera 510 is an image capturing device which captures images of two-dimensional data representing two-dimensional images. For example, the plurality of two-dimensional cameras 510 captures images of the same object in different directions. The plurality of two-dimensional cameras 510 are communicatively connected to composition unit 620. The plurality of two-dimensional cameras 510 transmit captured two-dimensional images to composition unit 620. It is to be noted that the number of two-dimensional cameras 510 included in transmission system 601 is not particularly limited.

Composition unit 620 is a processing unit which obtains two-dimensional images generated by the plurality of two-dimensional cameras 510 capturing images and composes the images, to generate three-dimensional data 400 representing three-dimensional images. Compression unit 620 is communicatively connected to encoding device 100, and transmits generated three-dimensional data 400 to encoding device 100. For example, compression unit 620 is configured with: a memory for storing a control program for causing compression unit 620 to execute processing thereof; and a processor which executes the control program.

As described above, transmission system 601 is capable of generating three-dimensional data 400 without using three-dimensional camera 500.

Embodiment 5

Next, an information processing system according to Embodiment 5 is described. It is to be noted that, in the descriptions of the information processing system according to Embodiment 5, differences from information processing systems 300 to 303 according to Embodiments 1 to 4 are mainly described, and descriptions of common elements may be partly simplified or omitted.

[Configuration]

The configuration of the information processing system according to Embodiment 5 is described with reference to FIGS. 16 to 18.

Figure 16:
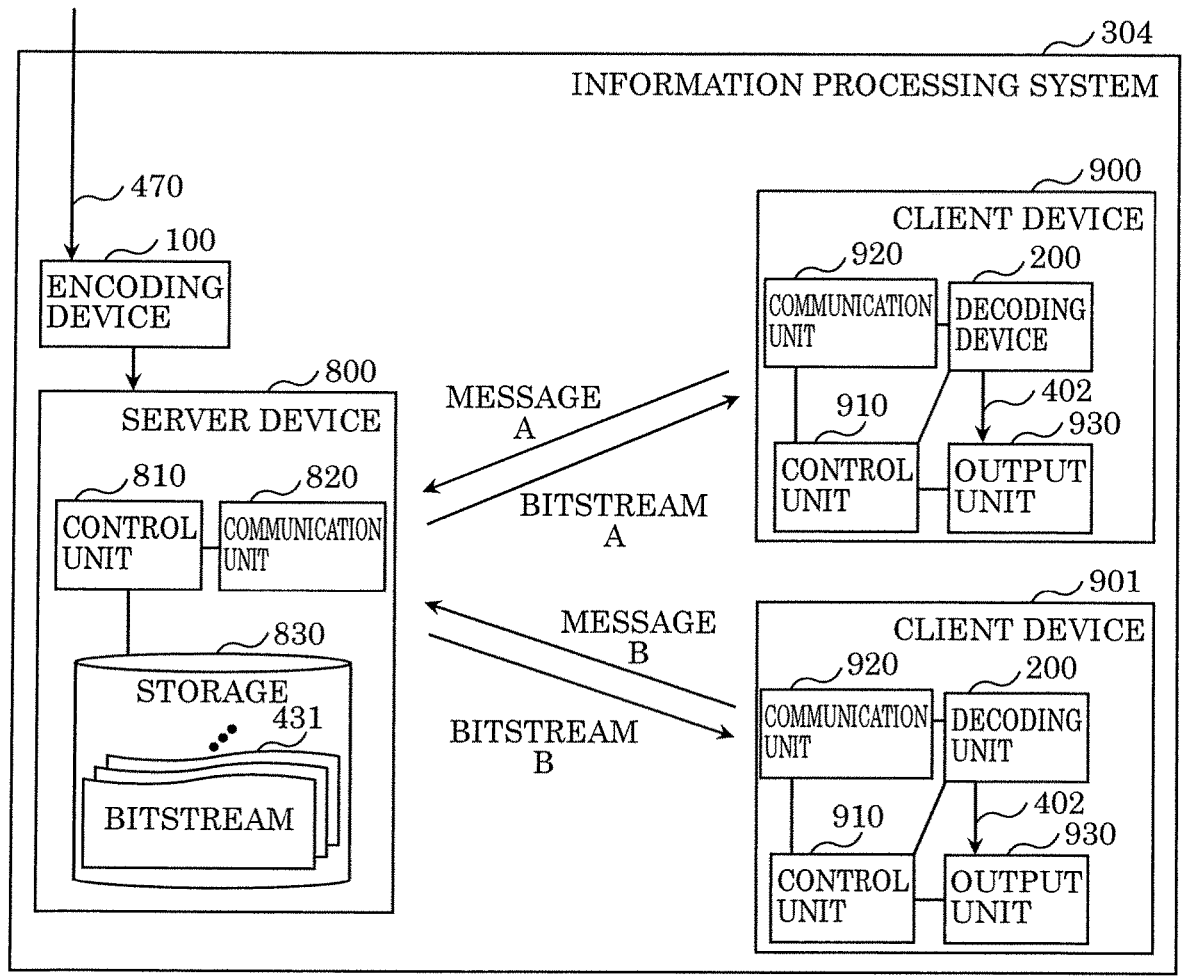
FIG. 16 is a block diagram for illustrating a functional configuration of an information processing system according to Embodiment 5.

FIG. 16 is a block diagram for illustrating a functional configuration of information processing system 304 according to Embodiment 5. FIG. 17 is a diagram for illustrating a processing procedure taken by encoding device 100 included in information processing system 304 according to Embodiment 5 encoding map data 470 which is one example of three-dimensional data, to generate bitstream 431. FIG. 18 is schematic diagram representing bitstream 431 generated by encoding device 100 included in information processing system 304 according to Embodiment 5 encoding map data 470 which is one example of three-dimensional data 400.

Figure 17:
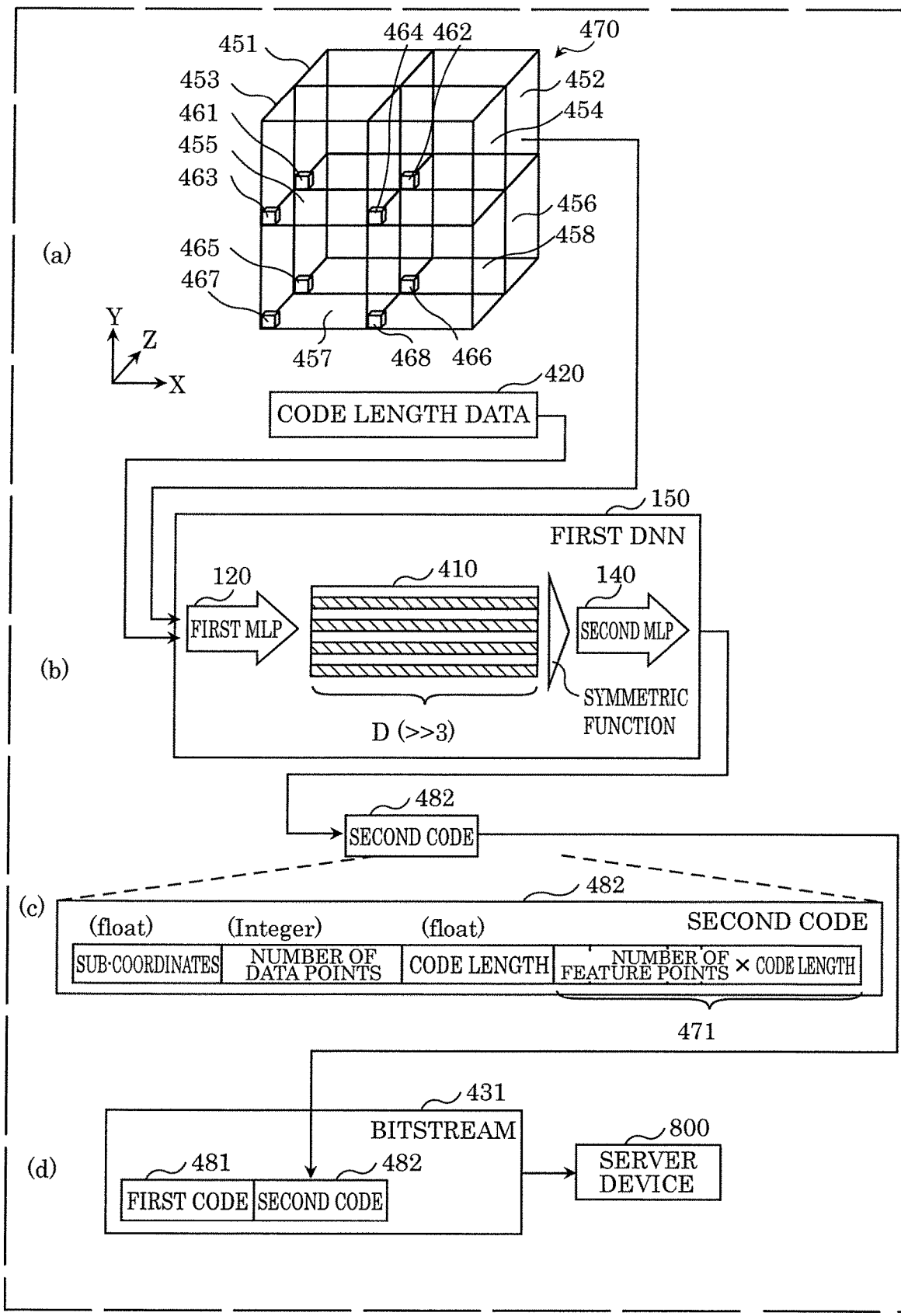
FIG. 17 is a diagram for illustrating a processing procedure in which the encoding device provided in the information processing system according to Embodiment 5 encodes map data which is one example of three-dimensional data to generate a bitstream.
Figure 18:
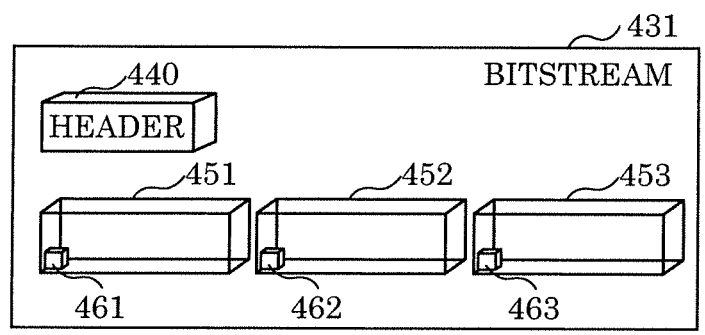
FIG. 18 is a schematic diagram illustrating a bitstream generated by the encoding device provided in the information processing system according to Embodiment 5 encoding map data which is one example of three-dimensional data.

It is to be noted that FIG. 18 illustrates a case where three sub-map data 451 to 453 are included in bitstream 431. In addition, although FIG. 18 schematically illustrates sub-map data 451 to 453, bitstream 431 includes data encoded as codes (for example, a second code indicated in (c) of FIG. 17).

As illustrated in FIG. 16, information processing system 304 includes encoding device 100, server device 800, client device 900, and client device 901.

Server device 800 is a server device which is communicatively connected to encoding device 100, and stores one or more bitstreams 431 encoded by encoding device 100. One or more bitstreams 431 include encoded map data 471 which is one example of encoded three-dimensional data 401 illustrated in FIG. 1. Server device 800 receives, from encoding device 100, bitstreams 431 including coded map data 471 in which map data 470 has been encoded, and stores one or more bitstreams 431. For example, encoding device 100 encodes map data 470 obtained from a not-shown outside device (for example, three-dimensional camera 500 illustrated in FIG. 14) to generate one or more bitstreams 431 including encoded map data 471, and transmits one or more bitstreams 431 generated to server device 800.

In addition, server device 800 is communicatively connected to each of client devices 900 and 901, and transmits bitstreams 431 to client devices 900 and 901. For example, when server device 800 has received a packet including a message from client device 900, server device 800 selects a bitstream based on the message received from one of the plurality of bitstreams 431 stored in storage 830, and transmits the bitstream to client device 900. FIG. 16 illustrates a case in which server device 800 receives the packet including message A, and transmits bitstream A which is one of the plurality of bitstreams 431. In addition, for example, when server device 800 has received a packet including message B from client device 901, server device 800 selects bitstream B which is one of the plurality of bitstreams 431, and transmits bitstream B to client device 901.

It is to be noted that the number of client devices included in information processing system 304 is not particularly limited. The number of client devices included in information processing system 304 may be one, or three or more. FIG. 16 illustrates a case in which information processing system 304 includes two client devices which are client device 900 and client device 901.

Server device 800 includes control unit 810, communication unit 820, and storage 830.

Control unit 810 is a processing unit which executes various kinds of processing of server device 800. For example, control unit 810 is configured with: a memory for storing a control program for causing control unit 810 to execute processing thereof; and a processor which executes the control program.

Communication unit 820 is a communication interface for communicating with encoding device 100 and client devices 900 and 901. For example, control unit 810 transmits bitstream 431 to client device 900 via communication unit 820. In addition, for example, control unit 810 receives bitstream 431 from encoding device 100 via communication unit 820, and stores bitstream 431 received to storage 830.

Storage 830 is a storage device which stores bitstream 430 received from encoding device 100. Storage 830 is implemented by, for example, an HDD, a flash memory, or the like.

Client devices 900 and 901 are devices which decode encoded map data 471 included in bitstream 431 received from server device 800 to generate three-dimensional data 402, generate three-dimensional images based on three-dimensional data 402 generated, and outputs the three-dimensional images. Each of client devices 900 and 901 is, for example, a smartphone, a tablet terminal, or a personal computer. Each of client devices 900 and 901 includes decoding device 200, control unit 910, communication unit 920, and output unit 930. It is to be noted that client devices 900 and 901 have substantially the same functional configuration. Thus, client device 900 is described below.

Control unit 910 is a processing unit which executes various kinds of processing of client device 900. For example, control unit 910 is configured with: a memory for storing a control program for causing control unit 910 to execute processing thereof, and a processor which executes the control program.

Communication unit 920 is a communication interface for performing communication with server device 800. For example, control unit 910 transmits a packet including message A via communication unit 920, and receives bitstream A corresponding to message A from client device 900. It is to be noted that client device 900 may further include a keyboard for receiving an instruction from a user, and an operation unit such as a touch panel. For example, client device 900 generate the packet including message A based on the instruction from the user received by the operation unit, and transmits the packet to server device 800.

Output unit 930 is a display device which outputs three-dimensional images based on three-dimensional data 402 generated by decoding device 200. Output unit 930 is, for example, rendering unit 720 illustrated in FIG. 14.

As described above, in information processing system 304, server device 800 stores one or more bitstreams 431. In addition, for example, server device 800 transmits bitstream 431 to client device 900, based on a request from client device 900 which the user operates. For this reason, with client device 900, the user can receive bitstream 431 that the user desires. In this way, according to information processing system 304, the user who operates client device 900 can communicate desired bitstream 431, and the communication data amount can be reduced.

[Examples of Three-Dimensional Data]

Three-dimensional data 400 which are used by the information processing system according to the present disclosure may be any data including three-dimensional coordinate data, and are not particularly limited. Next, a case in which information processing system 304 uses map data 470 including three-dimensional coordinate data representing three-dimensional map information is specifically described as one example of three-dimensional data 400 including three-dimensional coordinate data.

As illustrated in (a) of FIG. 17, map data 470 are one example of three-dimensional data including three-dimensional map information. Map data 470 includes a plurality of sub-map data each of which is one example of three-dimensional data 400. FIG. 17 illustrates a case in which map data 470 includes sub-map data 451 to 458.

Each of sub-map data 451 to 458 is one example of three-dimensional data 400 including three-dimensional map information. Each of sub-map data 451 to 458 is map data having three-dimensional map information indicating a partial area in the three-dimensional map information indicated by a corresponding one of map data 470.

In other words, for example, each of sub-map data 451 to 458 includes sub-map data representing three-dimensional map information indicating an area narrower than the entire area indicated by the three-dimensional map information represented by each of sub-map data 451 to 458. For example, sub-map data 451 includes sub-map data including three-dimensional map information indicating a partial area in the three-dimensional map information indicated by sub-map data 451.

For example, it is assumed that sub-map data A includes sub-map data AA and AB each having three-dimensional map information indicating a partial area in three-dimensional map information indicated by sub-map data A. For example, specifically, the map information indicated by sub-map data A is a map of Osaka Prefecture, the map information indicated by sub-map data AA is a map of Osaka City, and the map information indicated by sub-map data AB is a map of Takatsuki City.

For example, decoding is started with sub-map data A (for example, a random access point) when client device 900 requests reference to the three-dimensional map information indicated by sub-map data AA, and decoding is started with sub-map data AB when client device 900 requests reference to the three-dimensional map information indicated by sub-map data AB. For example, client device 900 receives an instruction from a user via a not-shown operation unit, selects sub-map data to be decoded firstly, and starts the decoding.

Each of sub-map data 451 to 458 includes a corresponding one of headers 461 to 468.

Each of headers 461 to 468 is a header including sub-coordinate information indicating sub-coordinates of the corresponding one of sub-map data 451 to 458. For example, header 461 includes sub-coordinate information indicating sub-coordinates of sub-map data 451. In addition, for example, header 462 includes sub-coordinate information indicating sub-coordinates of sub-map data 452.

Each of headers 461 to 468 is, for example, a random access header.

First DNN 150 included in encoding device 100 generates a code (packet) including encoded map data 471 generated by encoding map data 470, as illustrated in (b) and (c) of FIG. 17. In FIG. 17, each of (b) and (c) indicates, as one example, second code 482 which is a code including encoded map data 471 generated by encoding sub-map data 452. For example, encoded map data 471 is one example of encoded three-dimensional data 401 illustrated in FIG. 1.

Second code 482 is a packet including sub-coordinate information, the number of data points, a code length, and encoded map data 471 in a corresponding sub-map data 452. In this way, after encoding device 100 encodes one of sub-map data 451 to 458, encoding device 100 generates a code (that is, perform coding) including sub-coordinate information of a corresponding sub-map data, the number of data points of the corresponding sub-map data, a code length of codes used for the corresponding sub-map data, and encoded map data of the corresponding sub-map data.

Sub-coordinate information is information which is used to obtain absolute coordinates regarding reference coordinates (the coordinates of the entire target space) of each of sub-map data 451 to 458. In addition, sub-coordinate information is used, for example, for improvement for efficient coding of each of sub-map data 451 to 458. For example, sub-coordinate information is used for offset (correction) of the reference coordinates.

Next, encoding device 100 generates bitstream 431 including second code 482, as illustrated in (d) of FIG. 17. It is to be noted that (d) of FIG. 17 illustrates a case in which first code 481 is generated by encoding sub-map data 451 before encoding device 100 generates second code 482. In this way, encoding device 100 encodes each of sub-map data 451 to 458 included in map data 470 to generate, for example, second code 482, and integrates it into single bitstream 431. Encoding device 100 transmits, to server device 800, a bitstream including a plurality of codes (for example, first code 481 and second code 482).

As illustrated in FIG. 18, bitstream 431 includes three-dimensional data corresponding to sub-map data 451 to 453 and header 440.

Header 440 is a header including header information such as information indicating absolute coordinates regarding the reference world coordinates.

As described above, for example, server device 800 stores, in storage 830, encoded map data 470 (bitstream 430 in FIG. 16). Map data 470 may be divided into different sub-map data (eight sub-map data in (a) of FIG. 17).

It is to be noted that encoding device 100 may encode sub-map data 451 to 458 together with headers 461 to 468 each including sub-coordinate information a corresponding one of sub-map data 451 to 458.

In addition, for example, client device 900 transmits a message to server device 800. The message may include position information indicating the position of client device 900. Based on the position of client device 900, server device 800 (more specifically, control unit 810) obtains, from storage 830, bitstream 431 of sub-map data indicating the position closest to the position of client device 900.

As described above, bitstream 431 including encoded sub-map data further includes sub-coordinate information for each encoded sub-map data. Client device 900 obtains, using the sub-coordinate information, absolute coordinates in three-dimensional map information indicated by sub-map data regarding the reference coordinates. In this way, client device 900 is capable of obtaining the sub-map data associated with the absolute coordinates.

It is to be noted that each of sub-map data 451 to 458 (specifically, encoded sub-map data 451 to 458) is transmitted to client device 900 together with the sub-coordinate information as described above. The sub-coordinate information may be included in the corresponding one of headers 461 to 468 of sub-map data 451 to 458, or may be included in header 440.

In addition, the reference coordinates in the sub-coordinate information of each of sub-map data 451 to 458 may be included in header 440, or may be included in a corresponding one of headers 461 to 468.

In addition, each of sub-map data 451 to 458 may be configured in a single space (SPC). In addition, each of sub-map data 451 to 458 may be configured in a plurality of SPCs. In addition, each of sub-map data 451 to 458 may include a Group of Spaces (GOS). Each of sub-map data 451 to 458 may be configured in a world. For example, when a plurality of objects are present in each of sub-map data 451 to 458, the plurality of objects are assigned to separate SPCs so that each of sub-map data 451 to 458 is configured with a plurality of SPCs. In addition, for example, when the plurality of objects are assigned to single SPC, each of sub-map data 451 to 458 is configured with single SPC.

Variation 1

An encoding device may include, for example, a plurality of DNNs. In this case, for example, the encoding device may apply a separate DNN for each sub-map data, and add an identifier (DNN id) of the applied DNN to the header of the sub-map data.

Next, an information processing system according to Variation 1 of Embodiment 5 is described. It is to be noted that, in the descriptions of the information processing system according to Variation 1 of Embodiment 5, differences from information processing systems 300 to 304 according to Embodiments 1 to 5 are mainly described, and descriptions of common elements may be partly simplified or omitted.

Figure 19:
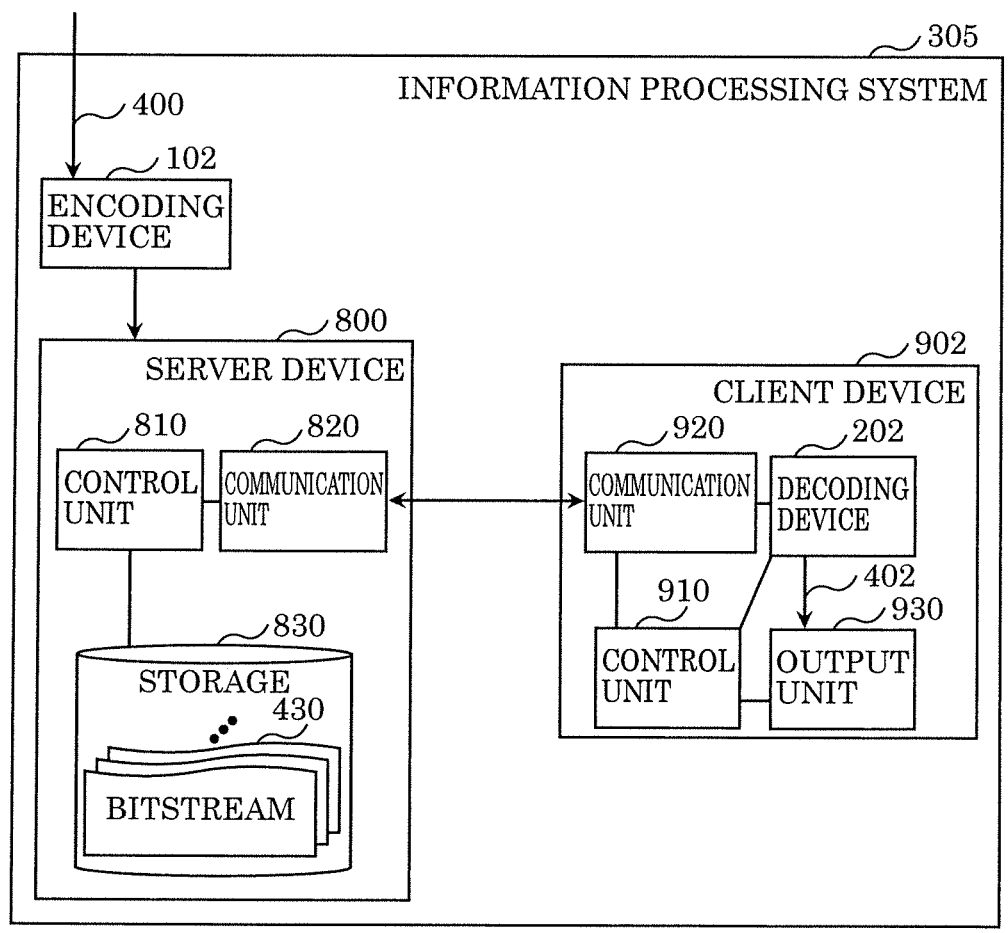
FIG. 19 is a block diagram for illustrating a functional configuration of an information processing system according to Variation 1 of Embodiment 5.

FIG. 19 is a block diagram for illustrating a functional configuration of information processing system 305 according to Variation 1 of Embodiment 5.

As illustrated in FIG. 19, information processing system 305 includes encoding device 102, server device 800, and client device 902. It is to be noted that information processing system 305 may include a plurality of client devices 902. FIG. 19 illustrates a case in which information processing system 305 includes single client device 902.

Client device 902 includes control unit 910, communication unit 920, and output unit 930. In this way, information processing system 305 is different from information processing system 304 according to Embodiment 5, in the configurations of the encoding device and the decoding device.

Figure 20:
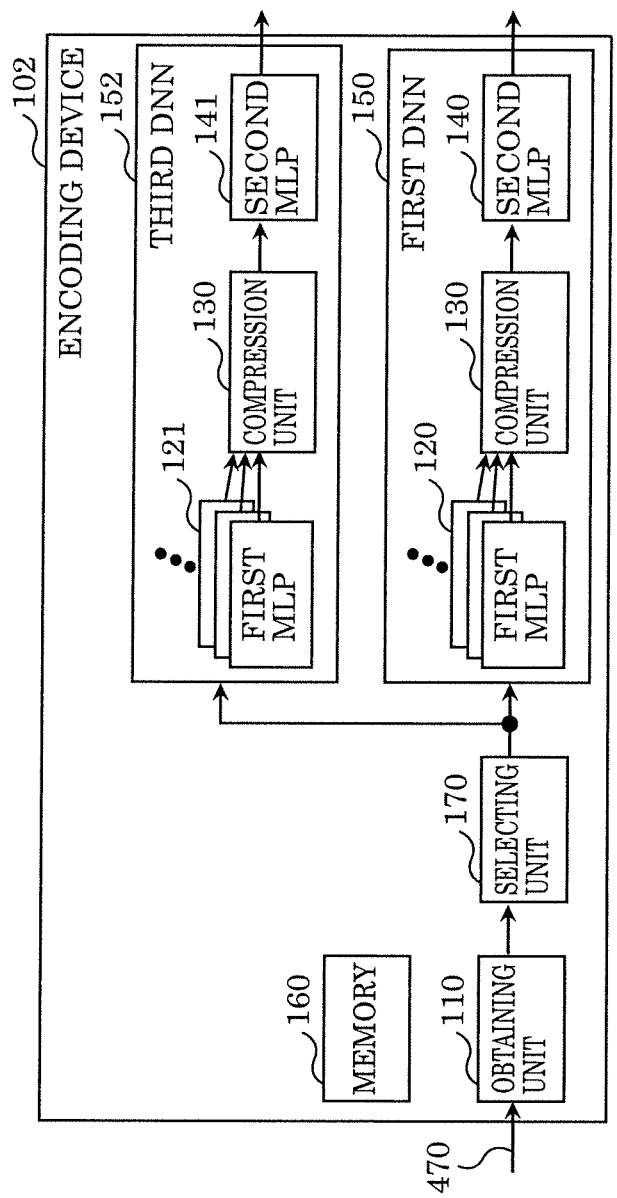
FIG. 20 is a block diagram for illustrating a functional configuration of an encoding device according to Variation 1 of Embodiment 5.

FIG. 20 is a block diagram for illustrating a functional configuration of encoding device 102 according to Variation 1 of Embodiment 5.

Likewise encoding device 100 illustrated in FIG. 1, encoding device 102 includes, for example, obtaining unit 110, first DNN 150, and memory 160. In addition, encoding device 102 further includes selecting unit 170 and third DNN 152.

Selecting unit 170 is a processing unit which selects a DNN which encodes three-dimensional data (in this example, map data 470) obtained by obtaining unit 110.

Selecting unit 170 is implemented with, for example, a control program for executing processing by selecting unit 170, and a processor which executes the control program.

Likewise first DNN 150, third DNN 152 is an encoding module which encodes three-dimensional data (in this example, map data 470).

Third DNN 152 includes, as functional elements, first MLP 121, compression unit 130, and second MLP 141.

Likewise first MLP 120, first MLP 121 is a processing unit which once transforms the three-dimensional data (in this example, map data 470) into higher-dimensional data in order to effectively encode the three-dimensional data (in this example, map data 470).

Likewise second MLP 140, second MLP 141 transforms a reduced number of data generated by compression unit 130 into encoded three-dimensional data having predetermined dimensions (for example, encoded map data 471 illustrated in (c) of FIG. 17), and outputs the encoded three-dimensional data generated.

In this way, third DNN 152 is one of a plurality of DNNs (first DNNs) included in encoding device 102.

Here, first DNN 150 and third DNN 152 execute encoding using different parameters. In other words, memory 160 stores, for example, (i) a parameter which is used by first DNN 150 to encode three-dimensional data 400, and (ii) a parameter which is used by third DNN 152 to encode three-dimensional data 400 and is different from the parameter which is used by first DNN 150 to encode three-dimensional data 400.

For example, map data 470 includes attribute information such as presence/absence of a passerby and presence/absence of a traffic light. In this way, the optimum parameter for encoding map data 470 may vary depending on a difference in attribute information such as presence/absence of a passerby and presence/absence of a traffic light. Selecting unit 170 selects the optimum DNN in order to encode map data 470, based on the attribute information such as presence/absence of a passerby and presence/absence of a traffic light included in map data 470.

Figure 21:
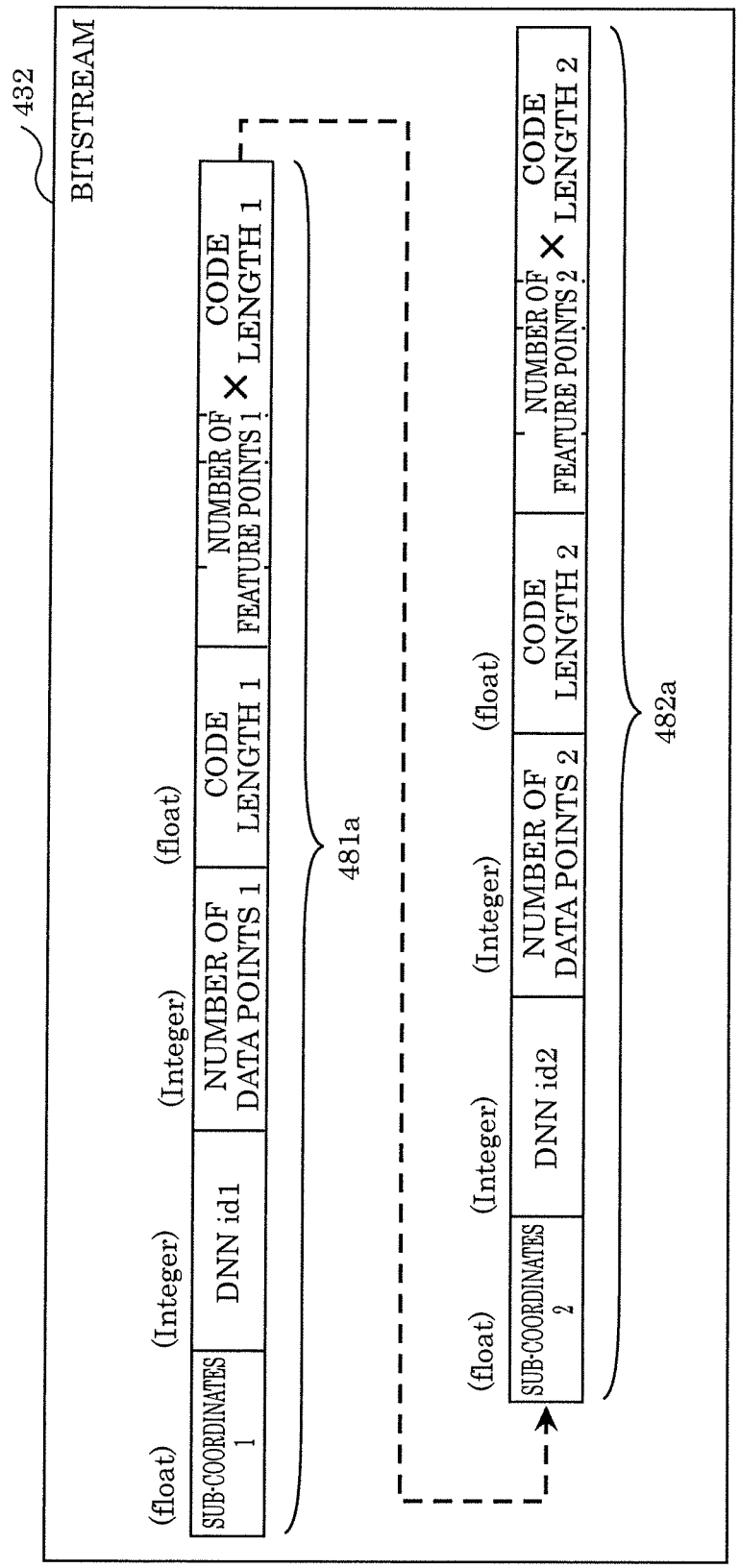
FIG. 21 is a diagram illustrating a specific example of a bitstream which is generated by the encoding device provided in the information processing system according to Variation 1 of Embodiment 5.

FIG. 21 is a diagram illustrating a specific example of bitstream 432 which is generated by encoding device 102 included in information processing system 305 according to Variation 1 of Embodiment 5.

As illustrated in FIG. 21, bitstream 432 includes first code 481*a* and second code 482*a*. Each of first code 481*a* and second code 482*a* includes: sub-coordinates; a DNN id; the number of data points; a code length; feature points×the code length (that is, encoded map data 471 which is three-dimensional data such as encoded sub-map data). In this way, bitstream 432 illustrated in FIG. 21 includes the DNN id unlike bitstream 431 illustrated in (d) of FIG. 17.

The DNN id is an identifier indicating which one of DNNs has been used to encode a corresponding one of sub-map data 451 to 458 from among the plurality of DNNs included in encoding device 102.

Although FIG. 20 illustrates a case in which encoding device 102 includes two DNNs which encode three-dimensional data using different parameters, it is to be noted that the number of DNNs included in encoding device 102 is not particularly limited. For example, encoding device 102 may include three or more DNNs.

Figure 22:
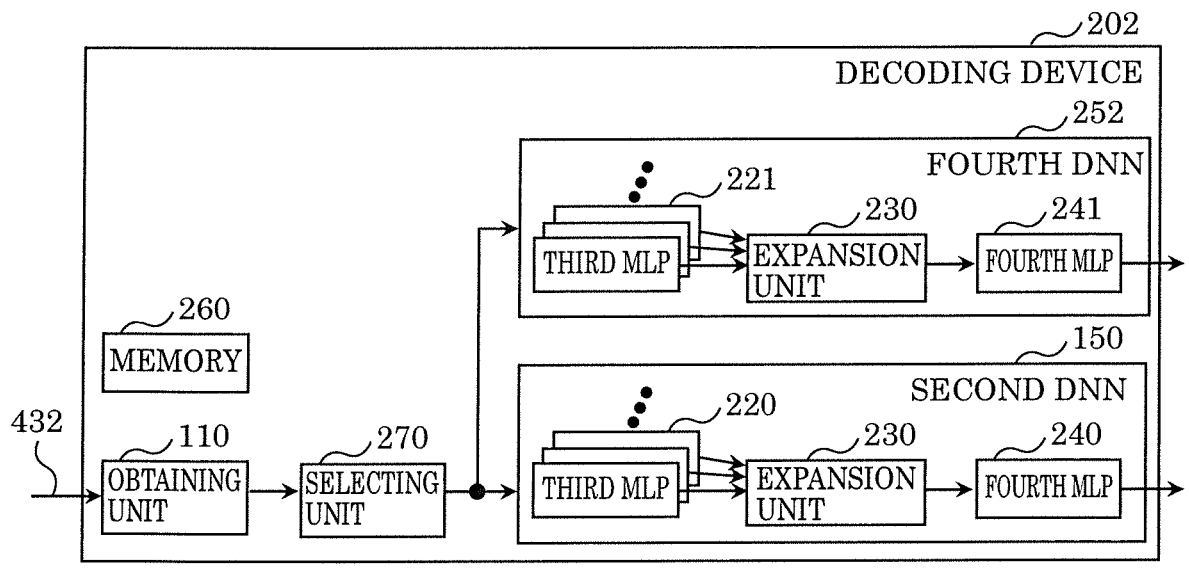
FIG. 22 is a block diagram for illustrating a functional configuration of a decoding device according to Variation 1 of Embodiment 5.

FIG. 22 is a block diagram for illustrating a functional configuration of decoding device 202 according to Variation 1 of Embodiment 5.

Likewise decoding device 200 illustrated in FIG. 1, decoding device 202 includes, for example, obtaining unit 210, second DNN 250, and memory 260. In addition, decoding device 202 further include selecting unit 270 and fourth DNN 252.

Selecting unit 270 is a processing unit which selects a DNN which decodes encoded three-dimensional data (for example, encoded map data 471 illustrated in (c) of FIG. 17) included in bitstream 432 obtained by obtaining unit 210. Selecting unit 270 is implemented with, for example, a control program for executing processing by selecting unit 270, and a processor which executes the control program.

Likewise second DNN 250, fourth DNN 252 is a decoding module which decodes encoded three-dimensional data.

Fourth DNN 252 includes, as functional elements, third MLP 221, expansion unit 230, and fourth MLP 241.

Likewise three MLP 220, third MLP 221 is a processing unit which transforms encoded three-dimensional data before expansion unit 230 expands the data into higher-dimensional data.

Likewise fourth MLP 240, fourth MLP 241 transforms transformed data 411 (see FIG. 3) generated by expansion unit 230 into three-dimensional data, and outputs the three-dimensional data transformed.

In this way, fourth DNN 252 is one of a plurality of DNNs (second DNNs) included in decoding device 202.

Here, second DNN 250 and fourth DNN 252 execute decoding using different parameters. In other words, memory 260 stores, for example, (i) a parameter which is used by second DNN 250 to decode encoded map data 471, and (ii) a parameter which is used by fourth DNN 252 to decode encoded map data 471 and is different from the parameter which is used by second DNN 250 to decode encoded map data 471.

For example, information included in map data 470 may vary depending on whether a passerby is present/absent, a traffic light is present/absent, or the like. More specifically, information such as presence/absence of a passerby and presence/absence of a traffic light included in each of sub-map data 451 to 458 included in map data 470 may vary between sub-map data 451 to 458. In this way, the optimum parameter for decoding each of encoded sub-map data 451 to 458 may vary depending on the presence/absence of a passerby and the presence/absence of a traffic light, or the like. For example, selecting unit 170 selects the optimum DNN for decoding based on a DNN id included in bitstream 432. For example, selecting unit 270 decodes the encoded sub-map data having DNN id 1 in bitstream 432 using second DNN 250, and decodes the encoded sub-map data having DNN id 2 in bitstream 432 using fourth DNN 252.

In this way, the information processing method which is executed by information processing system 305 is characterized in that: three-dimensional data 400 (for example, map data 470) further includes attribute information, for example; in the first input step of inputting three-dimensional data 400 to a DNN included in encoding device 102, for example, a single DNN is selected from among the plurality of DNNs (first DNN 150 and third DNN 152 based on attribute information, and the single DNN is input; bitstream 432 including encoded three-dimensional data 401 (for example, encoded map data 471) to be output by the DNN further includes a DNN identifier (DNN id) indicating the single DNN input in the above first input step; and in the second input step of inputting encoded three-dimensional data 401 included in bitstream 432 to a DNN included in decoding device 202, a single DNN is selected from among the plurality of DNNs (second DNN 250 and fourth DNN 252 based on the DNN id included in the bitstream, and the single DNN is input.

According to the method, for example, optimum parameters to be used for encoding by the DNN may vary depending on information included in three-dimensional data 400 of persons, traffic lights, etc. In such a case, the information processing method according to an aspect of the present disclosure makes it possible to cause a DNN (for example, first DNN 150 or third DNN 152) which encodes three-dimensional data 400 using a suitable parameter based on information included in three-dimensional data 400. For this reason, according to the method, three-dimensional data 400 is likely to be encoded more effectively. Likewise, according to the method, it is possible to cause a DNN which performs decoding using a suitable parameter to decode three-dimensional data based on information included in encoded three-dimensional data 401. For this reason, according to the method, encoded three-dimensional data 401 is likely to be decoded further effectively.

It is to be noted that, when a plurality of codes are included in bitstream 432 as in bitstream 431 illustrated in (d) of FIG. 17, a plurality of DNN ids may be collectively included in header information of bitstream 432.

This eliminates the need to add a DNN id for each of encoded sub-map data 451 to 458, which enables reduction in data amount of bitstream 432.

In addition, for example, decoding device 202 is capable of decoding information regarding the DNN based on the header information of bitstream 432, and decoding encoded map data 471 more precisely to generate data closer to data before being encoded, according to the DNN id added to the header of each of sub-map data 451 to 458.

Alternatively, information regarding the DNN for each identifier may be defined in advance according to a standard, or the like, and the information may not be included in the header information of bitstream 432.

In addition, one or more parameters of one or more DNNs included in encoding device 102 and/or decoding device 202 may be switched depending on a code length. For example, parameters for first MLP 120 may be calculated through training for respective code lengths, and the parameters for first MLP 120 may be switched depending on the value of the code length to be used for each of sub-map data 451 to 458. This also applies to the other MLPs such as second MLP 140.

In this way, encoding can be performed using optimum parameters at the time of high-scale encoding with a small code length and optimum parameters at the time of low-scale encoding with a lager code length. Thus, it is likely that an encoding efficiency is increased, that is, encoding is performed effectively. In addition, decoding device 202 is capable of reconstructing three-dimensional data more precisely by switching parameters to be used by MLPs depending on a code length.

In addition, encoding device 102 may add a parameter for a DNN for each code length to header information of bitstream 432.

In this way, encoding device 102 can transmit the parameter for the DNN used by encoding device 102 to encode map data 470 to decoding device 202, map data 470 can be reconstructed more precisely.

It is to be noted that a parameter for a DNN for each code length may be defined in advance according to a standard, or the like, and the information may not be included in the header information.

In addition, entire map data 470 may be encoded while changing the code length for each of sub-map data 451 to 458.

In this way, by selecting a code length suitably, it is possible to control a bit number to be generated (that is, to perform rate control).

In addition, decoding device 202 may decode encoded sub-map data 451 to 458 according to the code length added to the header information of encoded sub-map data 451 to 458 included in bitstream 432.

For example, important sub-map data can reduce losses in data amount by performing encoding with an increased code length. Here, important sub-map data is, for example, sub-map data indicating map information of an area in which client device 902 which receives encoded sub-map data is present or an area close to the position of client device 902. For example, encoding device 102 may encode sub-map data indicating map information of an area in which client device 902 is present or an area close to the position of client device 902 at a high bit rate using a code length of a large value, and encode sub-map data indicating map information of an area distant from the position of client device 902 at a low bit rate using a code length of a small value.

In addition, encoding device 102 may determine the code length for the sub-map data to be encoded next, based on a predetermined target bit rate and a generated coding amount in the case where the sub-map data is encoded.

In addition, encoding device 102 may encode a difference value between header information of a single sub-map data and header information of other encoded sub-map data, as the header information of the single sub-map data.

For example, encoding device 102 may encode difference value d between the number of data points 2 and the number of data points 1, instead of encoding the number of data points 2 in bitstream 432 illustrated in FIG. 21. In this case, decoding device 202 may calculate the number of data points 2 by adding difference value d and the number of data points 1.

Variation 2

Next, a description is given of a specific example for determining the value of the code length for three-dimensional data to be encoded by an encoding device.

Figure 23:
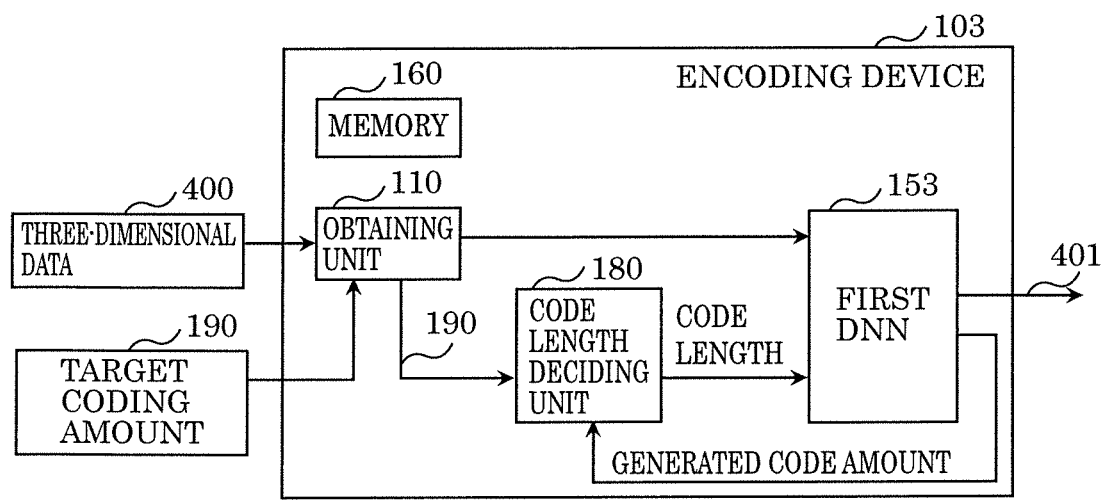
FIG. 23 is a block diagram for illustrating a functional configuration of an encoding device according to Variation 2 of Embodiment 5.

FIG. 23 is a block diagram for illustrating a functional configuration of encoding device 103 according to Variation 2 of Embodiment 5.

Encoding device 103 includes obtaining unit 110, first DNN 153, memory 160, and code length determining unit 180.

Obtaining unit 110 obtains, from not-shown outside device, three-dimensional data 400, data indicating a target coding amount 190 (hereinafter simply referred to as target coding amount 190). In addition, obtaining unit 110 outputs three-dimensional data 400 obtained to first DNN 153, and outputs target coding amount 190 to code length determining unit 180.

Target coding amount 190 is a target value of a coding amount of encoded three-dimensional data 401 to be encoded, at the time when first DNN 153 encodes three-dimensional data to generate encoded three-dimensional data 401. First DNN 153 generates encoded three-dimensional data 401 so that a resulting coding amount is close to target coding amount 190.

For example, first DNN 153 includes, as functional elements, not-shown first MLP 120, compression unit 130, and second MLP 140, likewise first DNN 150 illustrated in FIG. 1.

Unlike first DNN 150, first DNN 153 outputs a generated code amount which is generated at the time of encoding of three-dimensional data 400 to code length determining unit 180.

Code length determining unit 180 is a processing unit which determines the code length by first DNN 153 to perform encoding. Code length determining unit 180 is implemented with, for example, a control program for executing processing by code length determining unit 180, and a processor which executes the control program.

For example, code length determining unit 180 compares a generated code amount generated at the time of encoding of three-dimensional data 400 with target coding amount 190. For example, code length determining unit 180 calculates the difference between a generated code amount generated at the time of encoding of three-dimensional data 400 and target coding amount 190. Code length determining unit 180 changes the code length to be used by first DNN 153 to encode three-dimensional data 400 next based on the calculated difference. For example, when map data 470 illustrated in (a) of FIG. 17 is encoded, code length determining unit 180 sequentially encodes sub-map data 451 to 458 included in map data 470 based on a first code length to generate a plurality of encoded map data 471 based on sub-map data 451 to 458. Here, when a coding amount of encoded map data 471 (a generated coding amount) exceeds predetermined target coding amount 190, code length determining unit 180 changes the code length to be next used to encode sub-map data to a second code length shorter than the first code length.

It is to be noted that, for example, when encoding device 102 includes a plurality of DNNs (first DNN 150 and third DNN 152) as illustrated in FIG. 20, code length determining unit 180 may change a DNN which encodes map data 470, based on a coding amount (generated coding amount) of encoded map data 471.

In this way, the information processing method which is executed by the information processing system including encoding device 103 according to Variation 2 of Embodiment 5 is characterized in that: for example, in the first input step, a plurality of three-dimensional data (for example, sub-map data 451 to 458) and the first code length are input; in the encoding step of encoding three-dimensional data 400 to generate encoded three-dimensional data 401, the plurality of three-dimensional data 400 (for example, sub-map data 451 to 458) are sequentially encoded based on the first code length to generate encoded three-dimensional data 401 (for example, encoded sub-map data 451 to 458); when the coding amount of encoded three-dimensional data 401 generated exceeds predetermined target coding amount 190, the code length to be used to encode three-dimensional data 400 (for example, sub-map data 451 to 458) next is changed to the second code length shorter than the first code length.

According to such a method, when a plurality of three-dimensional data 400 are sequentially input to first DNN 153, the code length to be next used to encode three-dimensional data 400 can be selected appropriately for each time when first DNN 153 encodes three-dimensional data 400. For this reason, according to the method, first DNN 153 can generate encoded three-dimensional data 401 with a desirable encoding amount more easily.

It is to be noted that code length determining unit 180 may update a parameter to be used by first DNN 153 for encoding, based on a generated coding amount.

Variation 3

Figure 24:
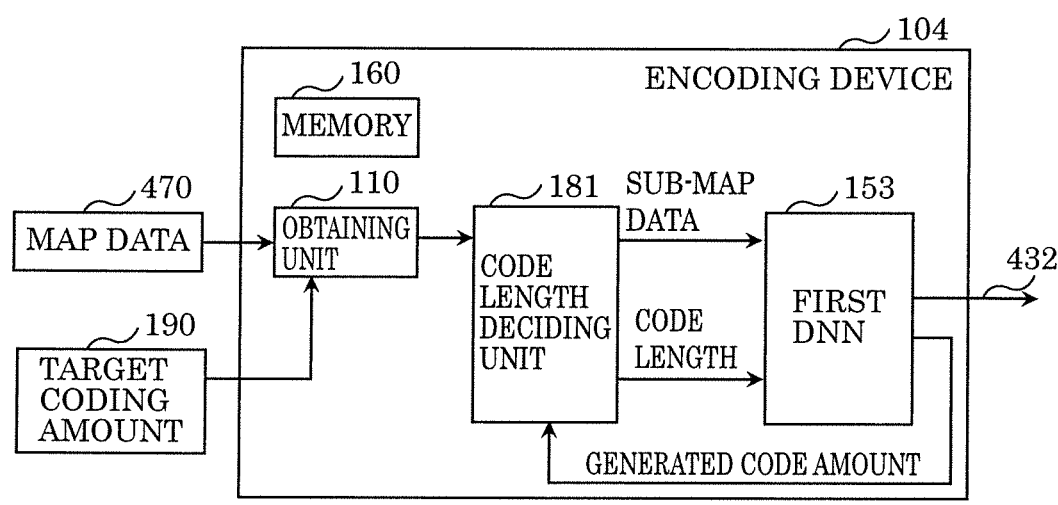
FIG. 24 is a block diagram for illustrating a functional configuration of an encoding device according to Variation 3 of Embodiment 5.

FIG. 24 is a block diagram for illustrating a functional configuration of encoding device 104 according to Variation 3 of Embodiment 5.

Encoding device 104 includes obtaining unit 110, first DNN 153, memory 160, and code length determining unit 181.

Obtaining unit 110 obtains, from not-shown outside device, three-dimensional data and target coding amount 190. FIG. 24 illustrates a case in which obtaining unit 110 has obtained map data 470 as three-dimensional data. In addition, obtaining unit 110 outputs map data 470 and target coding amount 190 obtained to code length determining unit 181.

Code length determining unit 181 is a processing unit which determines the code length by first DNN 153 to perform encoding. Code length determining unit 181 is implemented with, for example, a control program for executing processing by code length determining unit 181, and a processor which executes the control program.

In addition, when code length determining unit 181 obtains map data 470, code length determining unit 181 divides map data 470 into a plurality of sub-map data (for example, sub-map data 451 to 458). In addition, code length determining unit 181 determines the code length for each of sub-map data 451 to 458 obtained through the division.

First DNN 153 encodes each of sub-map data 451 to 458 based on the code length determined by code length determining unit 181, and collectively output the encoded sub-map data to bitstream 432.

It is to be noted that code length determining unit 181 may compare the generated coding amount generated at the time of encoding of sub-map data and target coding amount 190, and may change the code length to be used by first DNN 153 to encode sub-map data next, based on the comparison result.

In addition, code length determining unit 181 may update a parameter to be used by first DNN 153 for encoding, based on a generated coding amount.

In addition, code length determining unit 181 may divide map data 470 in such a manner that, for example, each of sub-map data 451 to 458 includes either the number of data points which is larger than or equal to first predetermined value α or the number of data points which is smaller than or equal to first predetermined value β.

In this way, first DNN 153 is to receive, as an input, either the number of data points larger than or equal to first predetermined value α or the number of data points smaller than or equal to first predetermined value β. For this reason, since the number of data points to be input to first DNN 153 is fixed to either the number of data points larger than or equal to first predetermined value α or the number of data points smaller than or equal to first predetermined value δ, for example, it is possible to update the parameter to be used by first DNN 153 for encoding more effectively.

In addition, code length determining unit 181 may divide map data 470 in such a manner that each of sub-map data 451 to 458 includes a predetermined important area. Code length determining unit 181 may generate, for example, sub-map data 451 to 458 including map information for each city, town, or village. In addition, code length determining unit 181 may divide map data 470 for each of objects such as buildings included in map data 470.

In this way, for example, when encoding device 104 includes a plurality of DNNs likewise encoding device 102, encoding device 104 is capable of encoding each of sub-map data 451 to 458 using the DNN suitable for the one of sub-map data 451 to 458. For this reason, the coding efficiency can be increased.

In addition, code length determining unit 181 may divide map data 470 in such a manner that each of sub-map data 451 to 458 partially overlaps with any one of the other sub-map data in map information indicated by the one of sub-map data 451 to 458.

For example, when code length determining unit 181 divides map data 470 including map information of City A, City B, and City C into two sub-map data, code length determining unit 181 may divide map data 470 into two sub-map data one of which indicates map information including City A and City B, and the other indicates map information including City B and City C.

In this way, with code length determining unit 181, it is possible to include the important area in the map information indicated by map data 470, in all of the sub-map data obtained through the division.

OTHER EMBODIMENTS

Although the encoding method, etc. according to one or more aspects of the present disclosure have been described based on each of embodiments and variations, the present disclosure is not limited to these embodiments and variations. The one or more aspects of the present disclosure may cover and encompass embodiments that a person skilled in the art may arrive at by adding various kinds of modifications to any of the above embodiments or by arbitrarily combining some of the constituent elements in different embodiments within the scope of the present disclosure.

For example, in the above embodiments, an example of encoding three-dimensional data 400 using DNNs is described. However, embodiments are not limited to the above embodiments. For example, the encoding device may further include an octree encoding unit capable of performing octree encoding for reducing a coding amount of encoded three-dimensional data 401 by representing three-dimensional data 400 in an octree structure, and the encoding device may encode three-dimensional data 400 using the octree encoding unit. The encoding device may, for example, encode each of sub-map data while selecting, for the sub-map data, encoding which provides a higher coding efficiency from among encoding by a DNN and encoding by the octree encoding unit. In this way, for example, the encoding device may add, to a bitstream, encoding information indicating which one of the DNN and the octree encoding unit encodes each sub-map data, and outputs the bitstream with the encoding information. In addition, for example, the decoding device may further include an octree decoding unit capable of performing octree decoding. In this case, for example, the decoding device may select one of a DNN and the octree decoding unit based on the encoding information included in the bitstream obtained, and causes the selected one to perform decoding.

In addition, for example, in each of the above embodiments, all or some of the constituent elements of the encoding device, the decoding device, etc. included in the information processing system may be configured with dedicated hardware, or may be implemented by executing a software program suitable for each of the constituent elements. Each of the constituent elements may be implemented by a programme executing unit such as a CPU, a processor, or the like reading out a software program recorded on a recording medium such as an HDD or a semiconductor memory, and executing the software program.

In addition, the processing unit of each of the constituent elements of the encoding device, the decoding device, or the like included in the information processing system may be configured with one or more electronic circuits. Each of the one or more electronic circuits may be a general-purpose circuit, or a dedicated circuit.

Each of the one or more electronic circuits may include, for example, a semiconductor device, an integrated circuit (IC), a large scale integration (LSI), or the like. ICs and LSIs may be integrated into a single chip, or integrated into a plurality of chips. Although ICs and LSIs are mentioned here, each circuit may be referred to as a system LSI, a very large scale integration (VLSI), or an ultra large scale integration (ULSI) depending on the degree of integration. In addition, a field programmable gate array (FPGA) programmed after manufacturing of an LSI can be used for the same purpose.

In addition, each of the general or specific aspects of the present disclosure may be implemented as a system, a device, a method, an integrated circuit, or a computer program. Alternatively, each of the general or specific aspects of the present disclosure may be implemented as a non-transitory computer-readable recording medium such as an optical disc, and HDD, or a semiconductor memory. In addition, each of the general or specific aspects of the present disclosure may be implemented as any combination of a system, a device, a method, an integrated circuit, a computer program, and a recording medium.

The present disclosure covers and encompasses embodiments that a person skilled in the art may arrive at by adding various kinds of modifications to any of the above embodiments or by arbitrarily combining some of the constituent elements and functions in any of the embodiments within the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to devices which encode three-dimensional point clouds effectively, and is applicable to, for example, information processing systems which store and transmit three-dimensional data.

What is claimed is:

1. An encoding method, comprising:
inputting a code length and three-dimensional data including three-dimensional coordinate data to a deep neural network (DNN), the three-dimensional data including N pieces of three-dimensional data, N being an integer greater than 1;
encoding, by the DNN, the three-dimensional data to generate encoded three-dimensional data; and
outputting a bitstream including (i) the code length, (ii) the encoded three-dimensional data, and (iii) a total number of the N pieces of three-dimensional data,
wherein the encoding includes:
transforming the N pieces of three-dimensional data into N pieces of D-dimensional data, D being an integer greater than 3;
transforming the N pieces of D-dimensional data into a single piece of D-dimensional data using a symmetric function;
generating the encoded three-dimensional data by transforming the single piece of D-dimensional data into a single piece of L-dimensional data using the code length, L being an integer different than D; and
generating the bitstream including (i) the code length, (ii) the encoded three-dimensional data, and (iii) a total number of the N pieces of three-dimensional data.

2. A decoding method, comprising:
obtaining a bitstream including (i) a code length, (ii) encoded three dimensional data generated from encoding first three-dimensional data including three-dimensional coordinate data, the first three-dimensional data including N pieces of first three-dimensional data, N being an integer greater than 1, and (iii) a total number of the N pieces of first three dimensional data;
inputting the encoded three-dimensional data to a deep neural network (DNN);
decoding, by the DNN, the encoded three dimensional data to generate second three-dimensional data; and
outputting the second three-dimensional data,
wherein the encoded three-dimensional data includes a single piece of L-dimensional data, L being an integer, and
wherein the decoding includes:
transforming the single piece of L-dimensional data into a single piece of D-dimensional data using the code length, D being an integer greater than 3 and different from L;
transforming the single piece of D-dimensional data into N pieces of D-dimensional data using a symmetric function; and
generating the second three-dimensional data by transforming the N pieces of D-dimensional data into N pieces of second three-dimensional data.

3. An information processing method, comprising:
inputting a first code length and first three-dimensional data including three-dimensional coordinate data to a first deep neural network (first DNN), the first three-dimensional data including N pieces of first three-dimensional data, N being an integer greater than 1;
encoding, by the first DNN, the first three-dimensional data to generate encoded three-dimensional data; and
outputting a bitstream including (i) the first code length, (ii) the encoded three-dimensional data, and (iii) a total number of the N pieces of first three-dimensional data,
wherein the encoding includes:
transforming the N pieces of first three-dimensional data into N pieces of first D-dimensional data, D being an integer greater than 3;
transforming the N pieces of first D-dimensional data into a single piece of first D-dimensional data using a symmetric function;
generating the encoded three-dimensional data by transforming the single piece of first D-dimensional data into a single piece of L-dimensional data using the first code length, L being an integer different than D; and
generating the bitstream including (i) the first code length, (ii) the encoded three-dimensional data, and (iii) a total number of the N pieces of first three-dimensional data, wherein information processing method further comprises:
inputting the encoded three-dimensional data to a second deep neural network (second DNN), the encoded three-dimensional data including the single piece of L-dimensional data;
decoding, by the second DNN, the encoded three dimensional data to generate second three-dimensional data; and
outputting the second three-dimensional data, and
wherein the decoding includes:
transforming the single piece of L-dimensional data into a single piece of second D-dimensional data using the first code length;
transforming the single piece of second D-dimensional data into N pieces of second D-dimensional data using the symmetric function; and
generating the second three-dimensional data by transforming the N pieces of second D-dimensional data into N pieces of second three-dimensional data.

4. The information processing method according to claim 3, further comprising:
calculating a computing loss which is a difference between the first three-dimensional data and the second three-dimensional data; and
updating a first parameter and a second parameter based on the computing loss, the first parameter being for encoding of the first three-dimensional data by the first DNN, the second parameter being for decoding of the encoded three-dimensional data by the second DNN.

5. The information processing method according to claim 4, further comprising:
calculating an adversarial loss indicating similarity between the first three-dimensional data and the second three-dimensional data,
wherein in the updating, the first parameter and the second parameter are updated based on the computing loss and the adversarial loss.

6. The information processing method according to claim 3,
wherein in the inputting of first three-dimensional data, a plurality of the first three-dimensional data and the first code length are input, and
in the encoding, the plurality of the first three-dimensional data are sequentially encoded based on the first code length to generate the encoded three-dimensional data, and when a data amount of the encoded three-dimensional data generated exceeds a predetermined target data amount, a code length to be used to encode a next one of the plurality of the first three-dimensional data is changed to a second code length which is shorter than the first code length.

7. The information processing method according to claim 3,
wherein the first three-dimensional data further includes attribute information,
in the inputting of first three-dimensional data, the first DNN is selected from a plurality of the first DNNs based on the attribute information and is input,
the bitstream further includes a DNN identifier indicating the first DNN input in the inputting of first three-dimensional data, and
in the inputting of the encoded three-dimensional data, the second DNN is selected from a plurality of the second DNNs based on the DNN identifier and is input.

8. An encoding device, comprising:
a processor; and
a memory,
using the memory, the processor performs:
inputting a code length and three-dimensional data including three-dimensional coordinate data to a deep neural network (DNN), the three-dimensional data including N pieces of three-dimensional data, N being an integer greater than 1;
encoding, by the DNN, the three-dimensional data to generate encoded three-dimensional data; and
outputting a bitstream including (i) the code length, (ii) the encoded three-dimensional data, and (iii) a total number of the N pieces of three-dimensional data,
wherein the encoding includes:
transforming the N pieces of three-dimensional data into N pieces of D-dimensional data, D being an integer greater than 3;
transforming the N pieces of D-dimensional data into a single piece of D-dimensional data using a symmetric function;
generating the encoded three-dimensional data by transforming the single piece of D-dimensional data into a single piece of L-dimensional data using the code length, L being an integer different than D; and
generating the bitstream including (i) the code length, (ii) the encoded three-dimensional data, and (iii) a total number of the N pieces of three-dimensional data.

9. A decoding device, comprising:
a processor; and
a memory,
using the memory, the processor performs:
obtaining a bitstream including (i) a code length, (ii) encoded three dimensional data generated from encoding first three-dimensional data including three-dimensional coordinate data, the first three-dimensional data including N pieces of first three-dimensional data, N being an integer greater than 1, and (iii) a total number of the N pieces of first three dimensional data;
inputting the encoded three-dimensional data and the code length to a deep neural network (DNN);
decoding by the DNN, the encoded three dimensional data to generate second three-dimensional data; and
outputting the second three-dimensional data,
wherein the encoded three-dimensional data includes a single piece of L-dimensional data, L being an integer,
wherein the decoding includes:
transforming the single piece of L-dimensional data into a single piece of D-dimensional data using the code length, D being an integer greater than 3 and different from L;
transforming the single piece of D-dimensional data into N pieces of D-dimensional data using a symmetric function; and
generating the second three-dimensional data by transforming the N pieces of D-dimensional data into N pieces of second three-dimensional data.

10. An information processing system, comprising:
a processor; and
a memory,
using the memory, the processor performs:
inputting a first code length and first three-dimensional data including three-dimensional coordinate data to a first deep neural network (first DNN), the first three-dimensional data including N pieces of first three-dimensional data, N being an integer greater than 1;

encoding, by the first DNN, the first three-dimensional data to generate encoded three-dimensional data; and outputting a bitstream including (i) the first code length, (ii) the encoded three-dimensional data, and (iii) a total number of the N pieces of first three-dimensional data, wherein the encoding includes:

transforming the N pieces of first three-dimensional data into N pieces of first D-dimensional data, D being an integer greater than 3;

transforming the N pieces of first D-dimensional data into a single piece of first D-dimensional data using a symmetric function;

generating the encoded three-dimensional data by transforming the single piece of first D-dimensional data into a single piece of L-dimensional data using the first code length, L being an integer different than D; and generating the bitstream including (i) the first code length, (ii) the encoded three-dimensional data, and (iii) a total number of the N pieces of first three-dimensional data, wherein the processing further performs:

inputting the encoded three-dimensional data to a second deep neural network (second DNN), the encoded three-dimensional data including the single piece of L-dimensional data;

decoding, by the second DNN, the encoded three dimensional data to generate second three-dimensional data; and outputting the second three-dimensional data, and wherein the decoding includes:

transforming the single piece of L-dimensional data into a single piece of second D-dimensional data using the first code length;

transforming the single piece of second D-dimensional data into N pieces of second D-dimensional data using the symmetric function; and generating the second three-dimensional data by transforming the N pieces of second D-dimensional data into N pieces of second three-dimensional data.

\* \* \* \* \*